(12) United States Patent  (10) Patent No.: US 8,253,954 B2
Eguchi et al.  (45) Date of Patent: Aug. 28, 2012

(54) IMAGE FORMING APPARATUS, PRINT SHEET SELECTION METHOD AND RECORDING MEDIUM

(75) Inventors: Hiroshi Eguchi, Okazaki (JP); Tatsuya Eguchi, Toyohashi (JP); Kiyohito Tsujihara, Hoi-gun (JP); Shigeo Tomita, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1240 days.

(21) Appl. No.: 12/027,129

(22) Filed: Feb. 6, 2008

(65) Prior Publication Data

US 2008/0186527 A1  Aug. 7, 2008

(30) Foreign Application Priority Data

Feb. 7, 2007 (JP) ................................ 2007-028611

(51) Int. Cl.
 *G06F 15/00* (2006.01)
(52) U.S. Cl. ..................... 358/1.14; 358/1.13; 358/1.15; 358/1.9
(58) Field of Classification Search ................ 358/1.14, 358/1.15, 1.13, 1.6, 1.9, 2.1, 448, 444, 404
See application file for complete search history.

(56) References Cited

U.S. PATENT DOCUMENTS

| | | | | |
|---|---|---|---|---|
| 5,703,972 A * | 12/1997 | Lopresti et al. | ............... | 382/310 |
| 6,550,904 B2 * | 4/2003 | Koitabashi et al. | ........... | 347/100 |
| 6,724,974 B2 * | 4/2004 | Naruto et al. | ................. | 386/241 |
| 7,851,409 B1 * | 12/2010 | Xu | ................. | 503/201 |
| 7,969,598 B2 * | 6/2011 | Kishi et al. | ................... | 358/1.15 |
| 8,035,839 B2 * | 10/2011 | Shaw | .......................... | 358/1.15 |
| 2001/0039244 A1 * | 11/2001 | Sasaki et al. | ................. | 503/201 |
| 2003/0105890 A1 * | 6/2003 | Sakuma | .......................... | 710/1 |
| 2003/0218647 A1 * | 11/2003 | Ogawa | ............................ | 347/16 |
| 2004/0179219 A1 * | 9/2004 | Wong et al. | .................. | 358/1.13 |

FOREIGN PATENT DOCUMENTS

| | | |
|---|---|---|
| JP | 7-115537 | 5/1995 |
| JP | 2000-148437 A | 5/2000 |
| JP | 2001-331294 A | 11/2001 |
| JP | 2004-279774 | 10/2004 |
| JP | 2005-242792 | 9/2005 |
| JP | 2006-44079 | 2/2006 |

OTHER PUBLICATIONS

Japanese Notification of Allowance mailed Sep. 15, 2009, directed to counterpart Japanese Application No. 2007-028611; 6 pages.
Notification of Reasons for Refusal mailed Feb. 3, 2009, directed to corresponding Japanese Patent Application No. 2007-028611; (4 pages).

* cited by examiner

*Primary Examiner* — King Poon
*Assistant Examiner* — Allen H Nguyen
(74) *Attorney, Agent, or Firm* — Morrison & Foerster LLP

(57) ABSTRACT

An image forming apparatus comprises at least one printer that prints inputted image data on a plurality of types of print sheets, an expiration time attribute detector that detects from the image data, data representing an expiration time attribute, and a controller that judges based on the detection result drawn by the expiration time attribute detector, on which type of print sheets the image data should be printed, among the plurality of types of print sheets, then controls the image forming apparatus itself based on the judgment.

17 Claims, 17 Drawing Sheets

IMAGE FORMING APPARATUS, PRINT SHEET SELECTION METHOD AND RECORDING MEDIUM

This application claims priority under 35 U.S.C. §119 to Japanese Patent Application No. 2007-28611 filed on Feb. 7, 2007, the entire disclosure of which is incorporated herein by reference in its entirety.

BACKGROUND OF THE INVENTION

1. Field of the Invention

The present invention relates to an image forming apparatus that is capable of printing inputted image data on a plurality of types of print sheets such as paper, paper-like mediums and electronic paper, a print sheet selection method, and a recording medium having a print sheet selection program stored therein to make a computer execute print sheet selection.

2. Description of the Related Art

The following description sets forth the inventor's knowledge of related art and problems therein and should not be construed as an admission of knowledge in the prior art.

There is a heretofore known image forming apparatus, wherein a paper medium such as ordinary paper for printing and electronic paper having functions of displaying image data thereon without power supply, deleting and overwriting the image data (being reusable), are loaded in its sheet feed trays. And the image forming apparatus selects between the paper medium and the electronic paper depending on image data to be printed.

By the way, it should be an issue from a viewpoint of saving resource of paper and etc. that image data with a short validity period left, e.g. image data read out from an application form with its application deadline coming near or a document to be updated right after being printed is printed on ordinary paper, since image data with a short validity period left will be supposedly discarded just in a short period.

To cope with this issue, it could be effective that image data with a short validity period left is printed on electronic paper having those functions mentioned above.

Heretofore, in advance for giving an instruction to write data on electronic paper, users have to select a sheet feed tray loading electronic paper among a plurality of sheet feed trays via an operation and display portion or other of the image forming apparatus.

However, uses may happen to select mistakenly a sheet feed tray loading ordinary paper instead of a sheet feed tray loading electronic paper. In this case, image data read out from a document will be printed on ordinary paper instead of electronic paper, which could cause a problem of wasting paper resource and print energy.

According to an art disclosed in the Japanese Unexamined Laid-open Publication 2000-148437, available periods of respective image data are administered by a server, and if a user instruction given to print image data is received, then it is judged from its available period whether or not to permit the image data to be printed.

However, with this art disclosed in the publication, it is judged from the validity period of image data whether or not to permit the image data to be printed, and it is not judged from the validity period or etc. of image data, on which type of print sheets the image data should be printed, which could not perfectly resolve the issue mentioned above.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide an image forming apparatus capable of selecting among types of print sheets depending on the expiration time or etc. of image data inputted to be printed.

It is another objective of the present invention to provide a print sheet selection method capable of selecting among types of print sheets depending on the expiration time or etc. of image data inputted to be printed.

It is yet another objective of the present invention to provide a computer readable recording medium having a print sheet selection program stored therein to make a computer of the image forming apparatus execute print sheet selection by the print sheet selection method.

According to a first aspect of the present invention, an image forming apparatus comprises:
  one or a plurality of printer(s) that print(s) inputted image data on a plurality of types of print sheets;
  an expiration time attribute detector that detects from the image data, data representing an expiration time attribute; and
  a controller that judges based on the detection result drawn by the expiration time attribute detector, on which type of print sheets the image data should be printed, among the plurality of types of print sheets.

According to a second aspect of the present invention, a print sheet selection method comprises:
  printing inputted image data on a plurality of types of print sheets;
  detecting from the image data, data representing an expiration time attribute; and
  judging based on the detection result drawn in the detection step, on which type of print sheets the image data should be printed, among the plurality of types of print sheets.

According to a third aspect of the present invention, a computer readable recording medium having a print sheet selection program stored therein to make a computer of the image forming apparatus execute:
  printing inputted image data on a plurality of types of print sheets;
  detecting from the image data, data representing an expiration time attribute; and
  judging based on the detection result drew in the detection step, on which type of print sheets the image data should be printed, among the plurality of types of print sheets.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Embodiment—1

Figure 1:
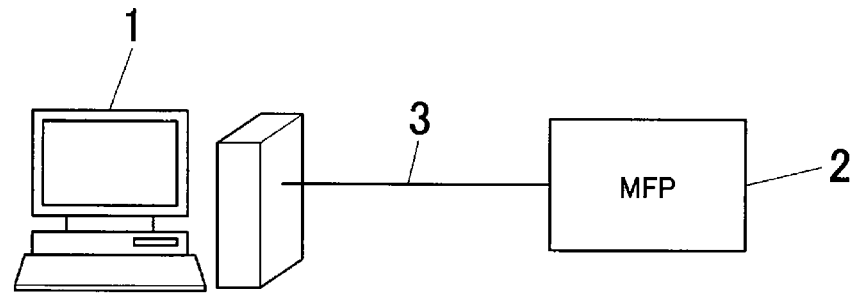
FIG. 1 is a view showing a configuration of a printing system in which an image forming apparatus according to one embodiment of the present invention is used.

FIG. 1 is a view showing an overall configuration of a printing system in which an image forming apparatus according to one embodiment of the present invention is used.

In this embodiment, a MFP (Multi Function Peripheral) that is a multifunctional digital machine is employed as an image forming apparatus, and an image forming apparatus is referred to also as simply a "printing apparatus".

In this printing system, a terminal apparatus 1 that is a personal computer (hereinafter, referred to as "PC") and a printing apparatus 2 are interconnected via a network 3.

The terminal apparatus 1 is a PC as mentioned above, and has document creation software so that users can create documents, images and etc. by using it, and various kinds of other software including a printer driver for the printing apparatus 2, which are installed thereon. When a user gives an instruction to output a document, an image or etc., after creating it by using the document creation software, a print job is created then transmitted to the printing apparatus 2 via the network 3, by the printer driver.

The printing apparatus 2 is capable of writing on electronic paper, and printing on OHP sheets and paper or paper-like mediums including ordinary paper. And the printing apparatus 1 executes a print job transmitted from an external apparatus such as the terminal apparatus 1 via the network 3. Further, according to a user instruction directly given via the operation and display portion 11 (shown in FIG. 2), the printing apparatus 2 reads a document placed on an automatic document feeder or a platen glass by an image reader 14 (shown in FIG. 2), then prints the document.

[Configuration of the Printing Apparatus 2]

Hereinafter, a configuration of the printing apparatus 2 will be explained with reference to FIG. 2.

Figure 2:
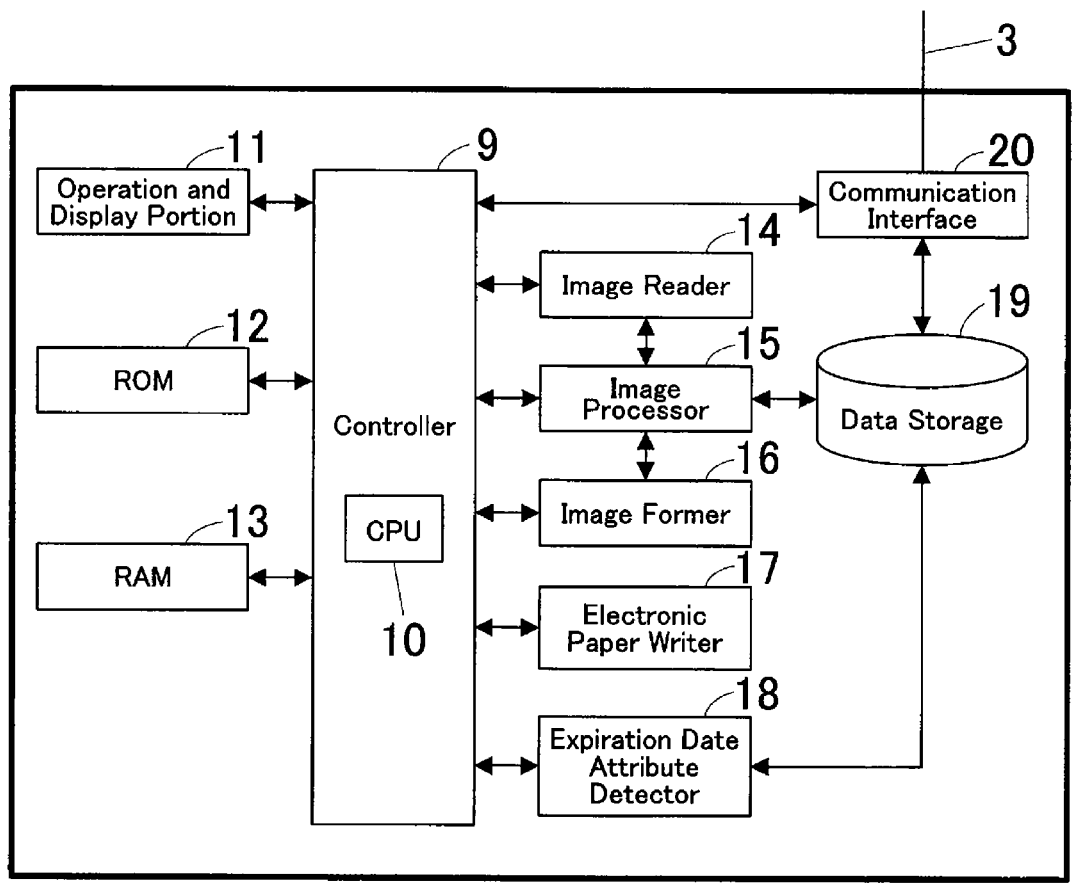
FIG. 2 is a block diagram schematically showing a configuration of an image forming apparatus according to one embodiment of the present invention.

FIG. 2 is a block diagram schematically showing a configuration of the printing apparatus 2.

The printing apparatus 2 comprises a controller 9, an operation and display portion 11, a ROM 12, a RAM 13, an image reader 14, an image processor 15, an image former 16, an electronic paper writer 17, an expiration time attribute detector 18, a data storage 19, a communication interface (a communication I/F) 20, and etc.

The controller 9 comprises a CPU 10, and controls the overall printing apparatus 2. Specifically, in this embodiment, it controls operations performed to select a type of print sheets to be printed, which will be detailed later.

The operation and display portion 11 displays various kinds of messages, screens to accept user operations of entry and selection, and others, and is used by users to perform setting operations for various functions of the printing apparatus 2. Thus, the operation and display portion 11 comprises a key entry portion such as a numeric keys pad, a touch-panel liquid crystal display, and etc.

The ROM 12 records a program executed by the CPU 10 of the controller 9 and other data.

The RAM 13 is a temporary recording medium, and it is used as an operation area when the CPU 10 of the controller 9 executes processing, and temporarily stores a program, data to be used when the program is executed, and other data.

The image reader 14 is a scanner for example. The image reader 14 reads a document placed by a user on an automatic document feeder or a platen glass to convert to image data that is electronic data.

The image processor 15 performs image processing in a heretofore known and predetermined manner, on the image data outputted by the image reader.

Figure 5:
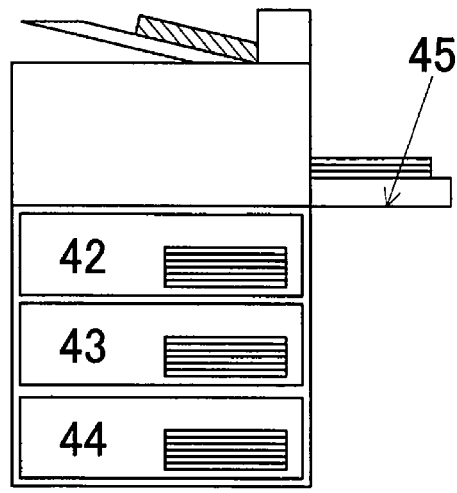
FIG. 5 is a view showing an example of an image forming apparatus loading print sheets therein.

The image former 16 forms an image to be printed, based on the image data processed in a predetermined manner by the image processor 15, then prints the formed image on paper mediums such as ordinary paper or paper-like mediums such as OHP sheets transferred from sheet feed trays 42, 43, 44 or a manual sheet feed tray 45 (these are shown in FIG. 5).

The electronic paper writer 17 prints (writes) the image data processed in a predetermined manner by the image processor 15 on electronic paper transferred from the sheet feed trays 42, 43, 44 or the manual sheet feed tray 45.

The expiration time attribute detector 18 detects data representing an expiration time attribute by analyzing the image data read out from a document by the image reader 14 in a predetermined manner.

Figures 3, 4:
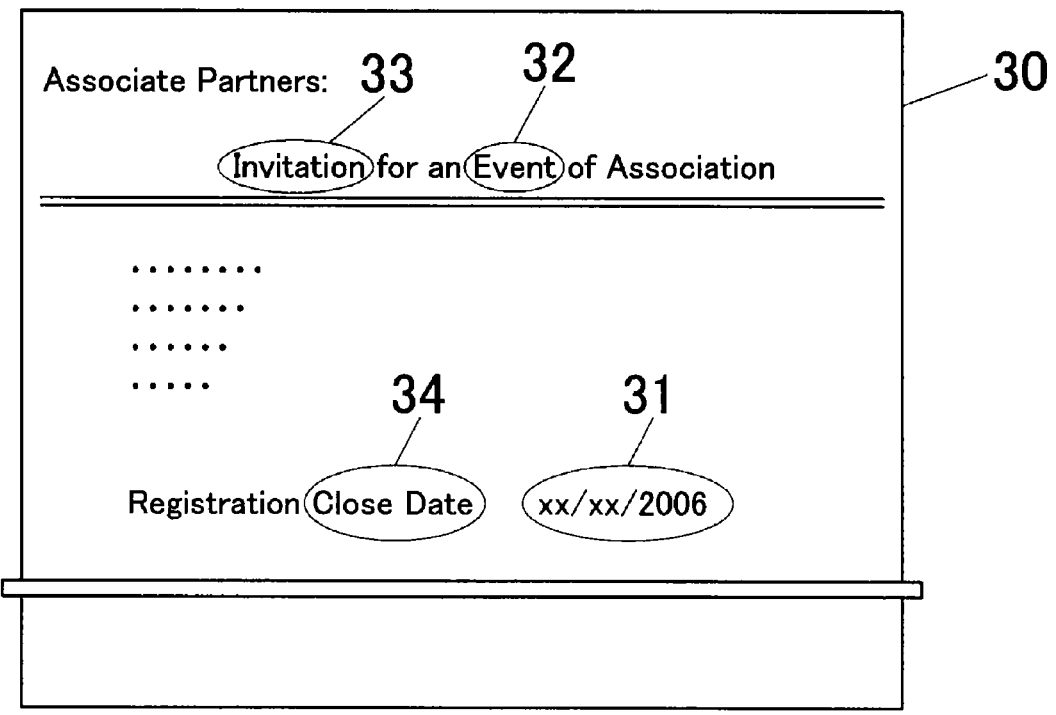
FIG. 3 is a view showing an example of image data (a document) including a date and certain keywords.
FIG. 4 is a view showing an example of data (a profile) attached to image data that is transmitted from a terminal apparatus.

The data representing an expiration time attribute indicates that the image data will eventually expire. The data representing an expiration time is for example, date data 31 and certain keywords representing an expiration time, which are included in an invitation letter 30 shown in FIG. 3. The certain keywords are for example, "event" 32, "invitation" 33 and "close date" 34 included in the invitation letter 30. Alternatively, the certain keywords can be "event invitation", "name list", "issued by association", "circulation memo", "calendar" and etc. Thus, the expiration time attribute detector 18 detects a date or certain keywords representing an expiration time, from the image data read out from a document by the image reader 14.

In this embodiment explained above, image data is read out from a document by the image reader 14. However, the printing apparatus 2 sometimes receives image data via the network 3 from an external apparatus such as the terminal apparatus 1. In this case, a date and certain keywords representing an expiration time can be detected from the received image data, or alternatively, can be detected from attached data 35 illustrated in FIG. 4, which is a profile of the image data and is received with the image data. Specifically, data representing an expiration time attribute can be detected from the file type, data size, creation date and time, access date and time of print data, and words relating to an expiration time, and etc. that are included in the attached data 35.

The data storage 19 is a recording medium such as a hard disk drive, and stores the image data read out from a document by the image reader 14, certain keywords representing an expiration time, which are to be detected by the expiration time attribute detector 18, and various kinds of data including the number of validity days and etc. preliminarily set by users.

The number of validity days is used for the judgment whether or not to write on electronic paper image data to be printed, which is made if the image data or its profile includes a date representing an expiration time. That is, if the number of validity days left for the image data to be printed is smaller than the preliminarily set number of validity days, then it is judged that the image data should be written on electronic paper, since the image data will become unnecessary in a short period. If the number of validate days left for the image data is larger than the preliminarily set number of validity days, then it is judged that the image data should be printed on ordinary paper, etc. that is other than electronic paper, since the image data will not become unnecessary in a short period.

Meanwhile, one same numbers of validity days can be set for respective image data with an expiration time, and a plurality of different numbers of validity days can be set for respective image data with an expiration time depending on their document types. For example, if a document of "event information" is read, "10" validity days is set for image data read out from the document, and if a document of "circulation memo" is read, "5" validity days is set for image data read out from the document.

The communication interface 20 helps data exchange with the terminal apparatus 1 that is an external apparatus, via the network 3.

Hereinafter, an operation to select a type of print sheets loaded in one of a plurality of sheet feed trays of the printing apparatus 2.

As shown in FIG. 5, the printing apparatus 2 comprises sheet feed trays 42, 43 and 44 so that print sheets could be sorted therein by their sizes and paper types, respectively. It further comprises a manual sheet feed tray 45 so that a user could manually feed thereon an arbitrarily prepared type of print sheets. If image data is acquired via the network 3 or by the image reader 14, under the control of the CPU 10 of the controller 9, the image data are processed in a predetermined manner by the image processor 15, and an appropriate type of print sheets loaded in the sheet feed trays 42, 43, 45 or the manual sheet feed tray 45 is selected automatically or according to a user instruction, and then the image data is printed or written on the selected type of print sheets.

The image forming apparatus 2 recognizes types of print sheets loaded in its paper feed trays by the following methods: a sensor such as a reflective sensor provided therein automatically detects types of print sheets; a user manually sets a configuration via the terminal apparatus 1; a user manually sets a configuration directly via the operation and display portion 11; and other methods.

Figure 6:
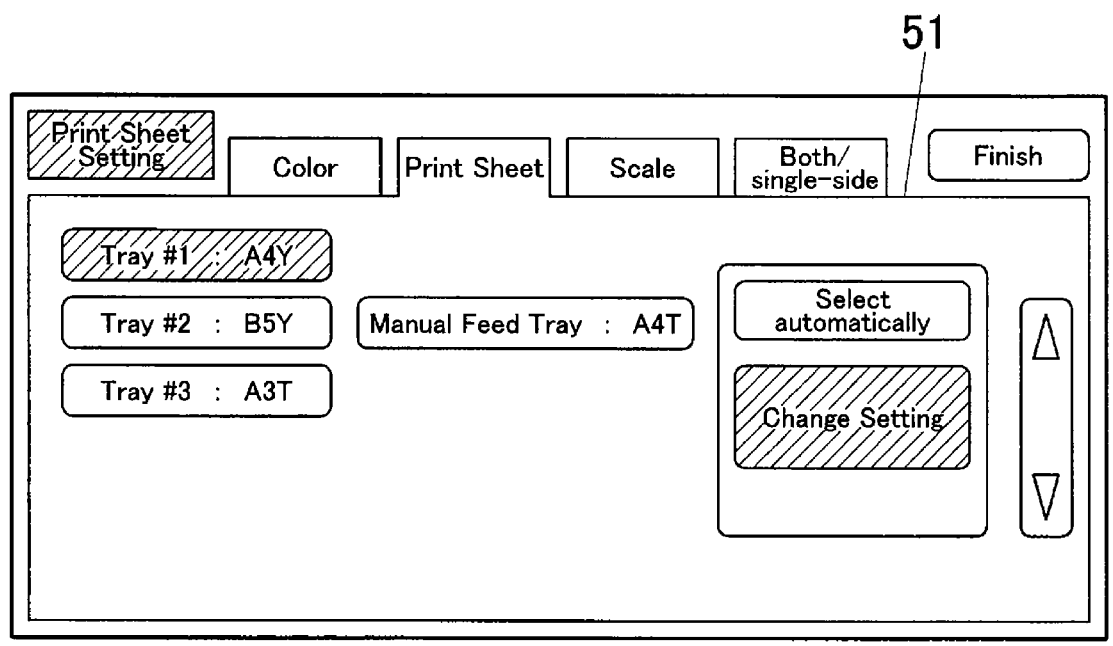
FIG. 6 is a view showing an example of a print sheet setting screen displayed when a user sets a type of print sheets about each of the trays.
Figure 7:
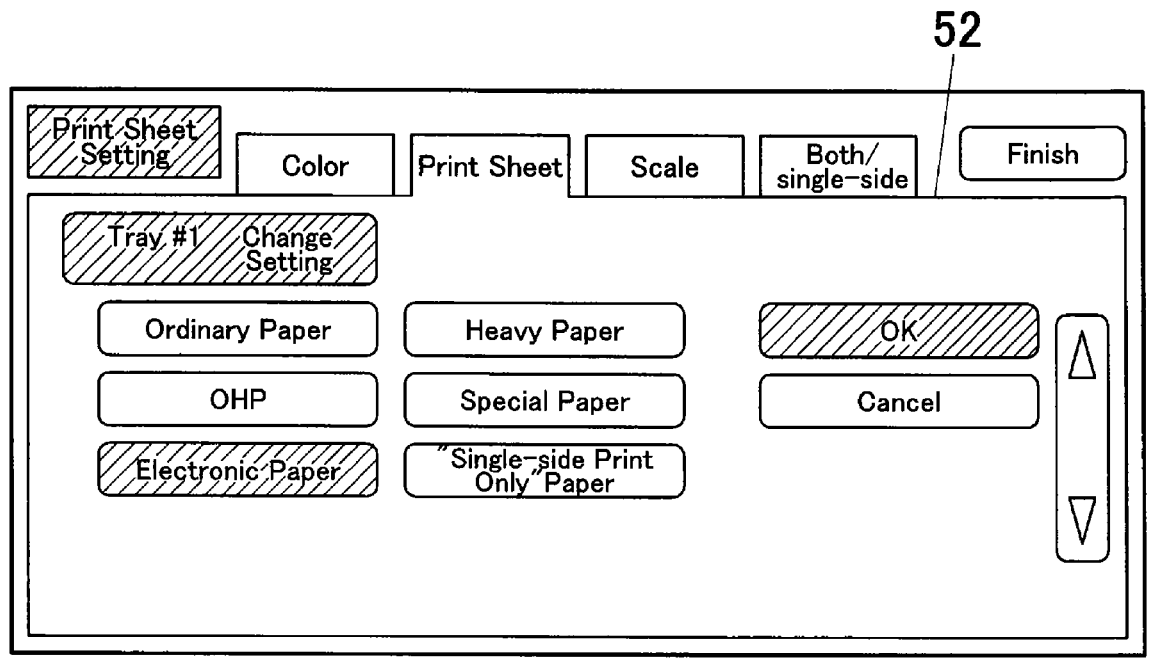
FIG. 7 is a view showing a screen displayed following the print sheet setting screen shown in FIG. 6.

For example, in the case of setting a configuration directly via the operation and display portion 11, when a user selects a tray to load print sheets via a tray selection screen 51 (shown in FIG. 6) displayed on the operation and display portion 11, a sheet setting screen 52 shown in FIG. 7 comes up thereon. And the user selects a type of print sheets to be loaded in the selected tray via the sheet setting screen 52. In this way, a type of print sheets is set on each of the sheet feed trays 42, 43, 44 and the manual sheet feed tray 45. In FIG. 6 and FIG. 7, keys indicated by hatching are selected by the user.

[Electronic Paper]

Hereinafter, basics of electronic paper will be simply explained without details, since this is heretofore known.

Although various structures can be applied to electronic paper, one of the structures generally used is a sandwich structure consisting of a filter layer, an ink layer, a driver layer, and another filter layer.

The filter layers protect the ink layer and the driver layer. The ink layer contains "microcapsules" each containing white or blue liquid or "electric-charged beads" each with its upper half and its lower half colored in the two colors respectively, which are spread out all over the layer. In whichever cases, the surface of the ink layer look plain "white" in the normal condition.

The driver layer gives a negative charge to parts on the ink layer, in order to make an image displayed. Then, in the case of microcapsules, the capsules containing white liquid are drawn to the backside and the capsules containing blue liquid are left behind closer to the foreside due to the electrophoretic phenomenon, which makes an image recognized by "black" color on electronic paper. In the case of electric-charged beads, the beads turn over in response to a given negative charge, which makes an image recognized by "black" and "white" colors. Meanwhile, there has been invented electronic paper that does not have the driver layer and is written by an external apparatus, for the purpose of cost reducing and freedom of its shape and size.

In this embodiment, this externally-written electronic paper not having the driver layer is employed. As a matter of course, the present invention is not limited to this embodiment and self-written electronic paper can be also employed.

Hereinafter, an operation performed in the printing apparatus 2 to write image data on electronic paper will be explained with reference to FIG. 8.

A transfer belt 64 is provided in the printing apparatus 2, and it takes one sheet of electronic paper 63 from the sheet feed trays 42, 43, 44 or the manual sheet feed tray 45, then transfers the electronic paper 63 to discharge it on a sheet discharge tray (not shown in Figure). The transfer belt 64 is run from a transfer roller 60 to a transfer roller 65 in the direction indicated by Arrow A, and thereby the electronic paper 63 is transferred.

Further, a delete head 61 that deletes data displayed on the electronic paper 63 is provided in the upper stream of transferring the electronic paper 63, and data displayed thereon is deleted when the electronic paper 63 passes by the delete head 61. Meanwhile, a print head 62 that writes data on the electronic paper 63 is provided in the lower stream of transferring the electronic paper, and data to be displayed thereon is written when the electronic paper 63 passes by the print head 62.

Figure 8:
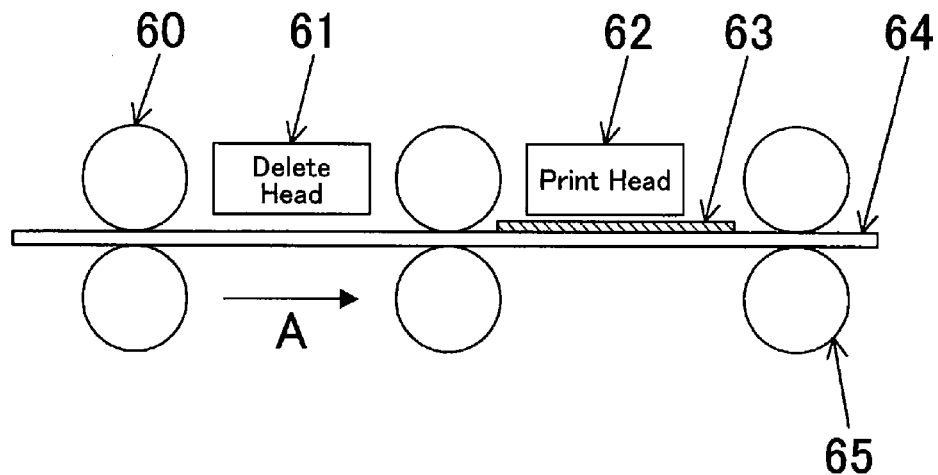
FIG. 8 is a view to explain operations performed in the image forming apparatus to write image data on electronic paper.

A route for transferring electronic paper is not limited to the straight-line one shown in FIG. 8, and can be curved in an arbitrary manner if it appropriately transfers electronic paper.

Figure 9:
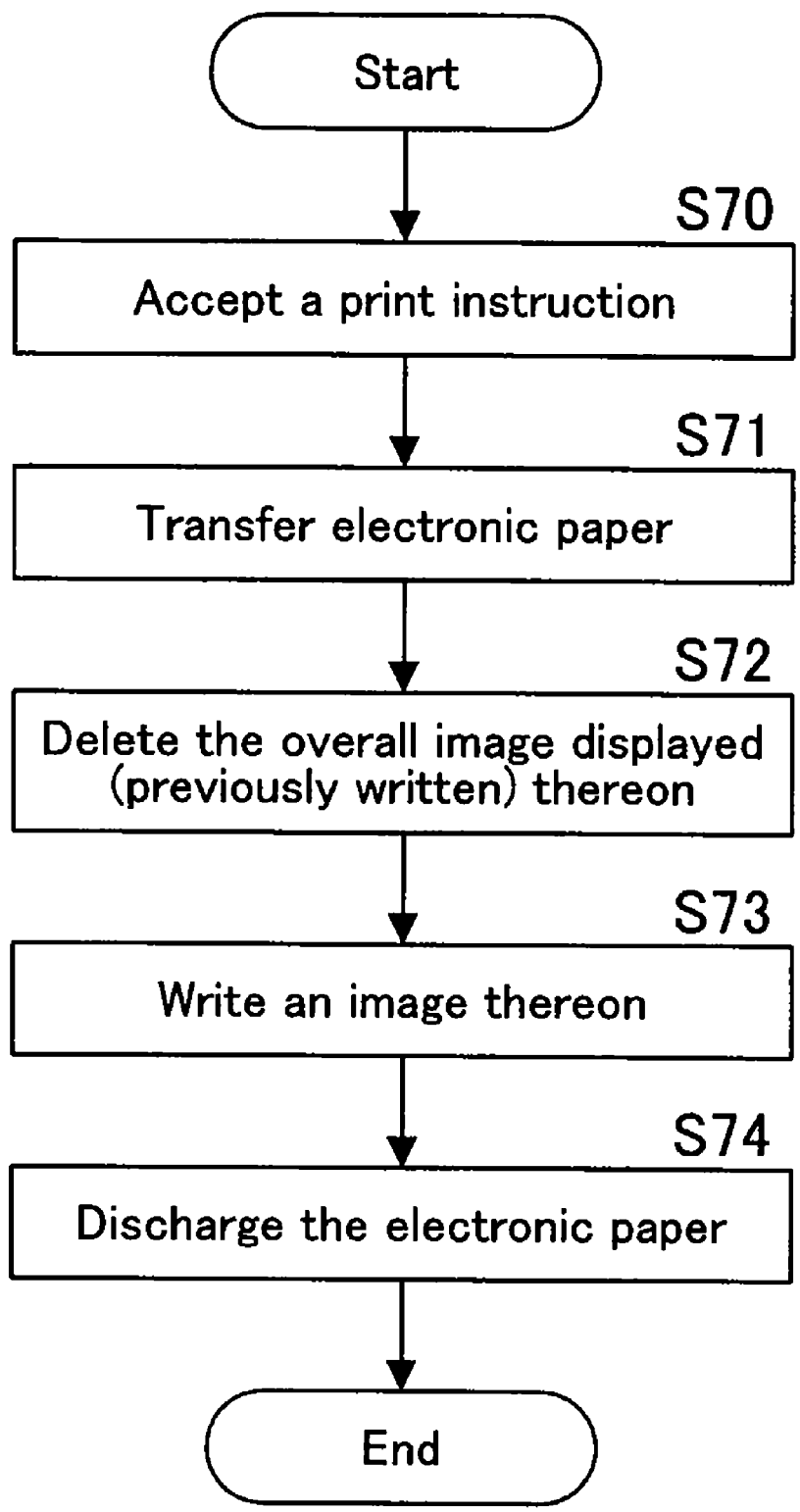
FIG. 9 is a flowchart showing a procedure performed in the image forming apparatus to write image data on electronic paper.

Hereinafter, a procedure performed in the printing apparatus 2 to write image data on electronic paper, will be explained with reference to a flowchart shown in FIG. 9. This procedure is executed by the CPU 10 of the controller 9 according to a program stored in a recording medium such as the ROM 12.

If a print instruction given by a user is accepted (Step S70), under the control of the CPU 10 of the controller 9, one sheet of electronic paper 63 is taken from the sheet feed trays 42, 43, 44 or the manual sheet feed tray 45, and the transfer roller 60 is rotated and the transfer belt 64 is run, thereby the electronic paper 63 is transferred (Step S71). Subsequently, under the control of the CPU 10 of the controller 9, data still displayed on the electronic paper 63 is deleted by the delete head 61 (Step S72), and image data is written thereon by the print head 62 (Step S73), and then the electronic paper 63 is discharged on a sheet discharge tray (Step S74).

Since a method of deleting by the delete head 61 and a method of printing by the print head 62 are heretofore known, explanation about these methods is omitted here.

[Operations of the Printing Apparatus 2]

In this first embodiment of the present invention, it is judged whether or not image data read out from a document includes a date or a certain keyword representing an expiration time. Then, depending on the judgment result, the image data is written (printed) on electronic paper or ordinary paper. A procedure described right above, which is performed in the printing apparatus 2, will be explained with reference to a flowchart shown in FIGS. 10 and 11. This procedure is executed by the CPU 10 of the controller 9 according to a program stored in a recording medium such as the ROM 12.

Further, the sheet feed trays 42, 43, 44 and the manual sheet feed tray 45 load only ordinary paper and electronic paper therein.

If a print instruction given by a user is accepted (Step S90), under the control of the CPU 10 of the controller 9, a document placed by the user is read by the image reader 14 (Step S91), and an expiration time is detected from image data read out from the document by the expiration time attribute detector 18, in other words, it is judged whether or not the image data includes a date representing an expiration time (Step S92).

Figure 11:
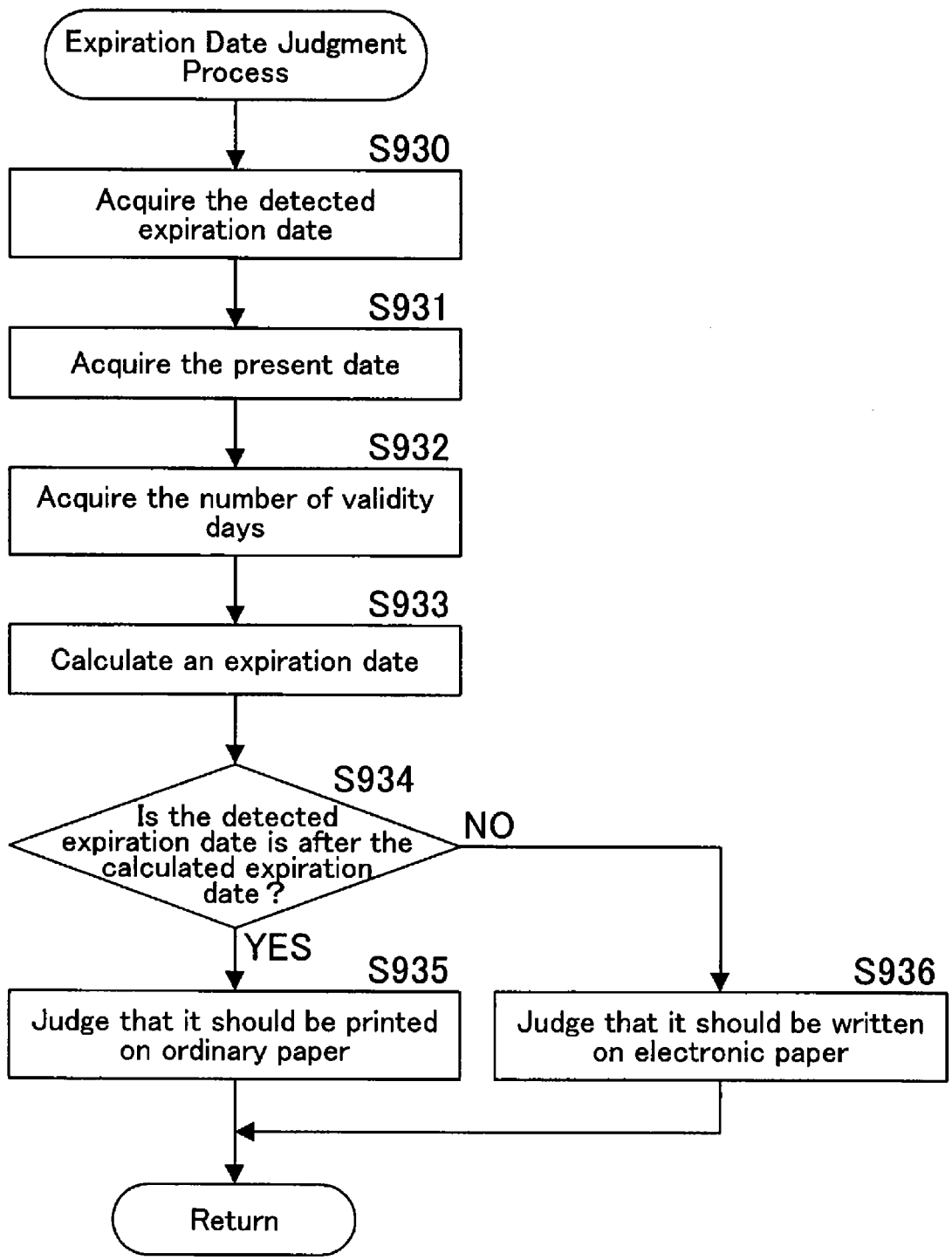
FIG. 11 is a subroutine showing an expiration time judgment process that is Step S93 of the flowchart in FIG. 10.

If it is judged that the image data includes a date representing an expiration time (YES in Step S92), the routine proceeds to Step S93 and an expiration time judgment process shown in FIG. 11 is performed.

Jumping ahead to Step S930 of FIG. 11 for the expiration time judgment process, under the control of the CPU 10 of the controller 9, the date representing an expiration time, which is detected therefrom, is acquired (Step S930). Then, the present date is acquired from inside of the apparatus (Step S931), and then the number of validity days, which is stored in the data storage 19, is acquired (Step S932).

Subsequently, under the control of the CPU 10 of the controller 9, an expiration time is calculated based on the present date and the number of validity days that are just acquired (Step S933). Then the routine proceeds to Step S934.

For example, if the acquired present date is Sep. 20, 2006 and the acquired validity days are "10" days, then the expiration time is calculated as Sep. 30, 2006.

In Step S934, under the control of the CPU 10 of the controller 9, it is judged whether or not the detected date representing an expiration time is after the calculated expiration time. If it is judged that the detected date representing an expiration time is after the calculated expiration time (there are many validity days) (YES in Step S934), under the control of the CPU 10 of the controller 9, it is judged that the image data should be printed on ordinary paper (Step S935), since the image data will not be unnecessary in a short period. Then, the routine returns and proceeds to Step S97 of FIG. 10. On the other hand, if it is judged that the detected date representing an expiration time is before the calculated expiration time (there are just a few validity days) (NO in Step S934), under the control of the CPU 10 of the controller 9, it is judged that the image data should be printed on rewritable electronic paper (Step S936), since the image data will be unnecessary in a short period. Then, the routine returns and proceeds to Step S95 of FIG. 10.

Figure 10:
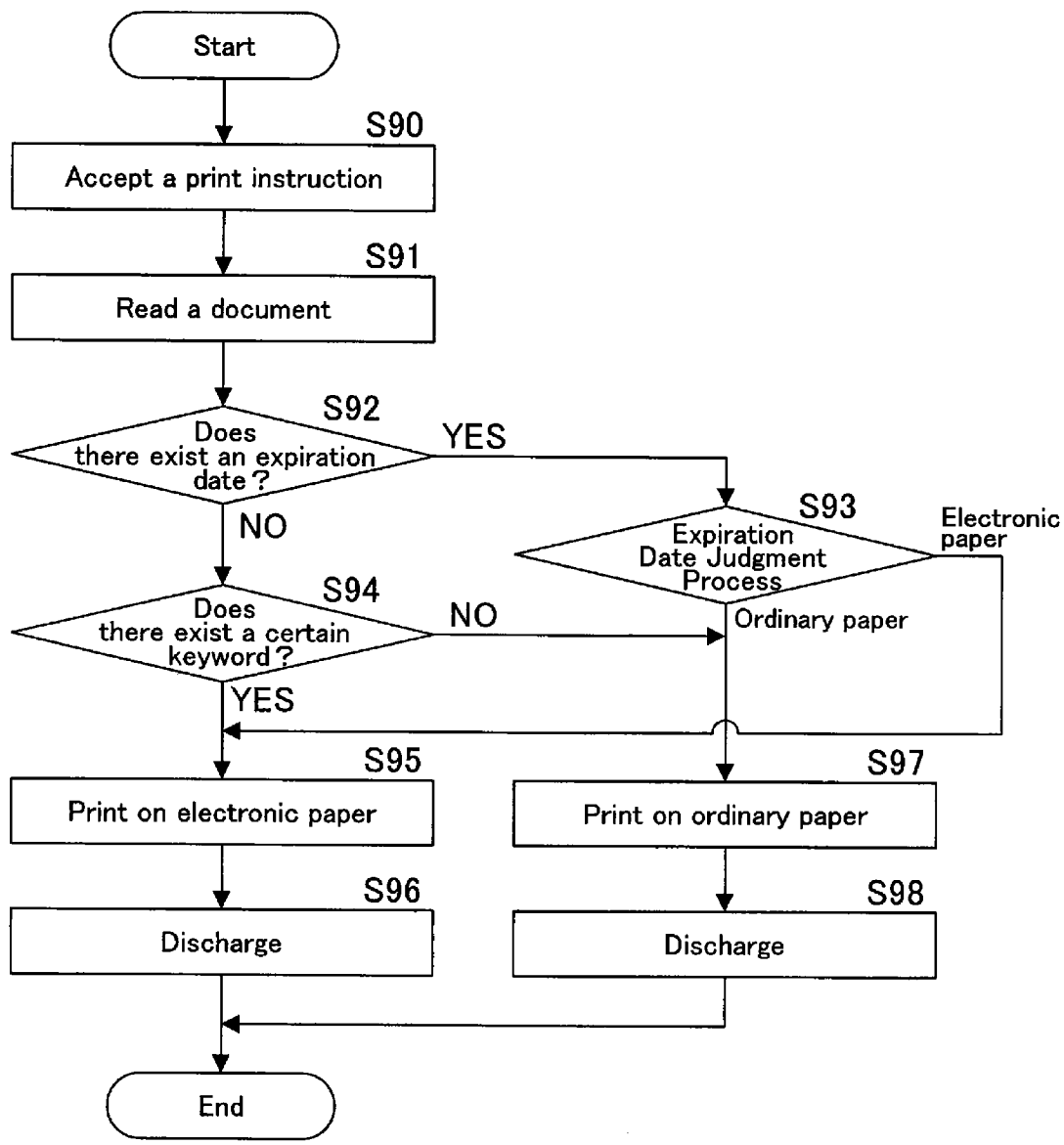
FIG. 10 is a flowchart showing a procedure performed in the image forming apparatus according to a first embodiment of the present invention.

In Step S92 of the flowchart shown in FIG. 10, if it is judged that the image data does not include a date representing an expiration time (NO in Step S92), under the control of the CPU 10 of the controller 9, a certain keyword is detected by the expiration time attribute detector 18, in other words, it is judged whether or not the image data includes a certain keyword representing an expiration time (Step S94), since the image data still may include it.

If it is judged that the image data does not include a certain keyword (NO in Step S94), the routine proceeds to Step S97 since the image data does not have an expiration time. If it is judged that the image data includes a certain keyword (YES in Step S94), the routine proceeds to Step S95 since the image data has an expiration time.

In Step S97, under the control of the CPU 10 of the controller 9, an image to be printed is formed by the image former 16 based on the image data transmitted from the image processor 15 and the formed image is printed on ordinary paper.

And the ordinary paper is discharged onto a sheet discharge tray (Step S98). Then the routine terminates.

In Step S95, under the control of the CPU 10 of the controller 9, the image data is written on electronic paper by the electronic paper writer 17. And the electronic paper is discharged onto a sheet discharge tray (Step S96). Then the routine terminates.

For example, if the date representing an expiration time, which is detected from the image data, is Sep. 25, 2005 and the calculated expiration time is Sep. 30, 2006, the image data read out from the document will be written on electronic paper, since the detected date representing an expiration time is before the calculated expiration time. In another case, if the date representing an expiration time, which is detected from the image data, is Oct. 10, 2006 and the calculated expiration time is Sep. 30, 2006, the image data will be printed on ordinary paper, since the detected date representing an expiration time is after the calculated date.

In this embodiment, image data with a certain keyword or with a short validity period left is printed on electronic paper and image data with no certain keyword or with a long validity period is printed on ordinary paper, but the present invention is not limited to this embodiment. For example, it can be configured such that image data with an expiration time is printed on poor-quality (or inexpensive) paper such as recycle paper and image data with no expiration time is printed on high-quality paper, in other words, an appropriate type of print sheets is selected among a plurality of types of print sheets. Further, in this embodiment, a date representing an expiration time, which is included in image data, is used for the judgment in Step S934 of the flowchart shown in FIG. 11, but the present invention is not limited to this embodiment. For example, it can be configured such that an application date, a creation date and etc. are used for the judgment, if image data includes these dates.

As described above in this embodiment, it is judged whether or not image data read out from a document includes an expiration time attribute. And even if it is judged that the image data has an expiration time, either electronic paper or ordinary paper on which the image data should be written or printed is selected depending on the number of days left before the expiration time. In this way, users obtain electronic paper carrying the image data with a short validity period left thereon printed without wasting paper resource, and users do not have to discard ordinary paper carrying the image data after using it just for a short period in the alternate case where they obtain the ordinary paper. Further, a type of print sheets is automatically selected, thereby users do not have to select a type of print sheets manually.

Embodiment—2

Hereinafter, an image forming apparatus according to a second embodiment of the present invention will be explained. In this second embodiment, an user instruction given to select a type of print sheets is accepted, if it is judged that image data read out from a document includes a date representing an expiration time and the image data has a short validity period left, or if it is judged that the image data includes a certain keyword representing an expiration time. Since a printing system and a printing apparatus 2 according to this second embodiment have the same configurations as those according to the first embodiment, explanation about their configurations are omitted here. Further, sheet feed trays 42, 43, 44 and a manual sheet feed tray 45 of the printing apparatus 2 load only ordinary paper and electronic paper therein.

[Operations of the Printing Apparatus 2]

Figure 12:
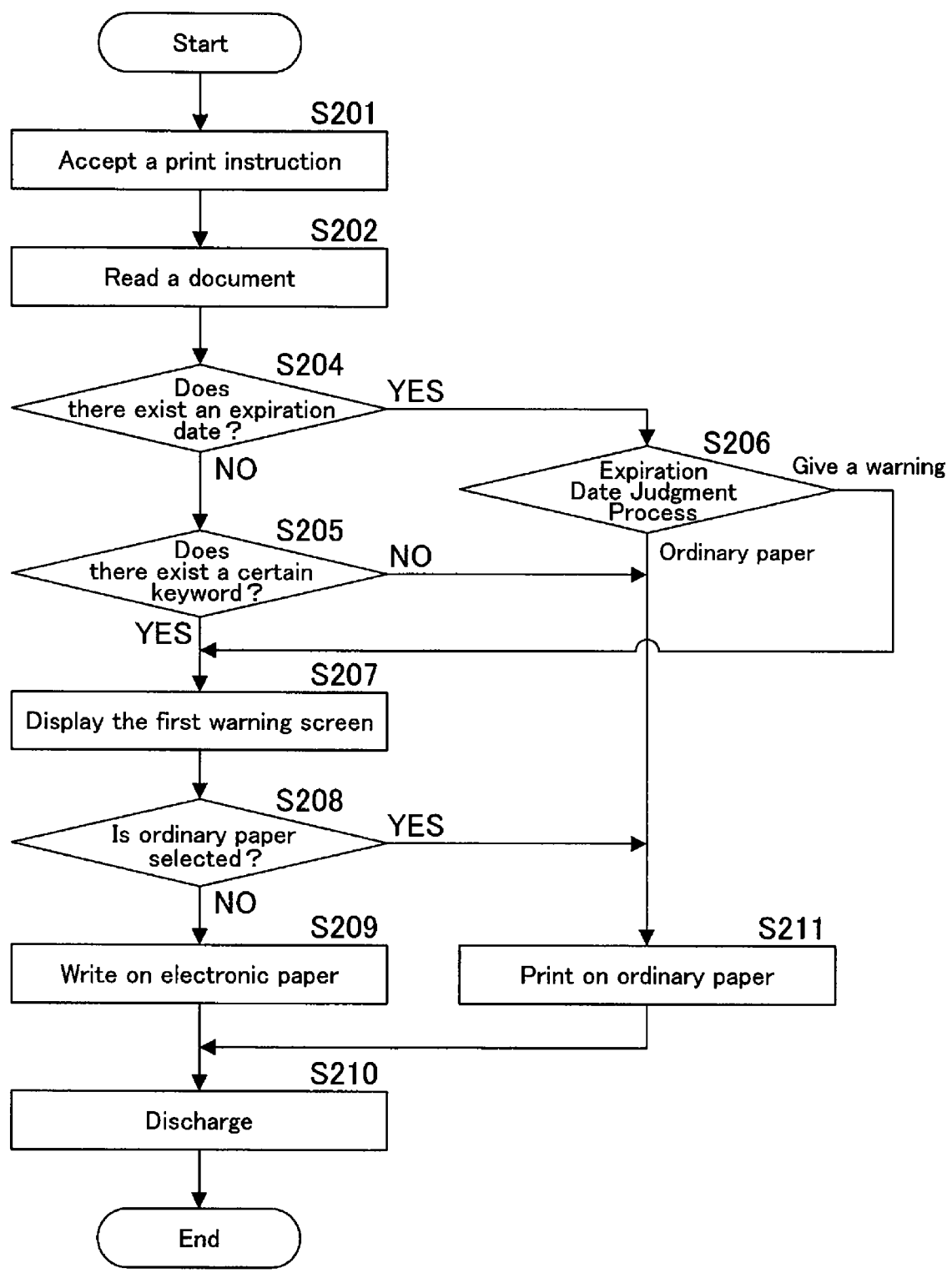
FIG. 12 is a flowchart showing a procedure performed in the image forming apparatus according to a second embodiment of the present invention.

A procedure described above, which is performed in the printing apparatus 2, will be explained with reference to a flowchart shown in FIG. 12. This procedure is executed by the CPU 10 of the controller 9 according to a program stored in a recording medium such as the ROM 12.

If a print instruction given by a user is accepted (Step S201), under the control of the CPU 10 of the controller 9, a document placed by the user is read by the image reader 14 (Step S202), and an expiration time is detected from image data read out from the document by the expiration time attribute detector 18, in other words, it is judged whether or not the image data includes a date representing an expiration time (Step S204).

Figure 13:
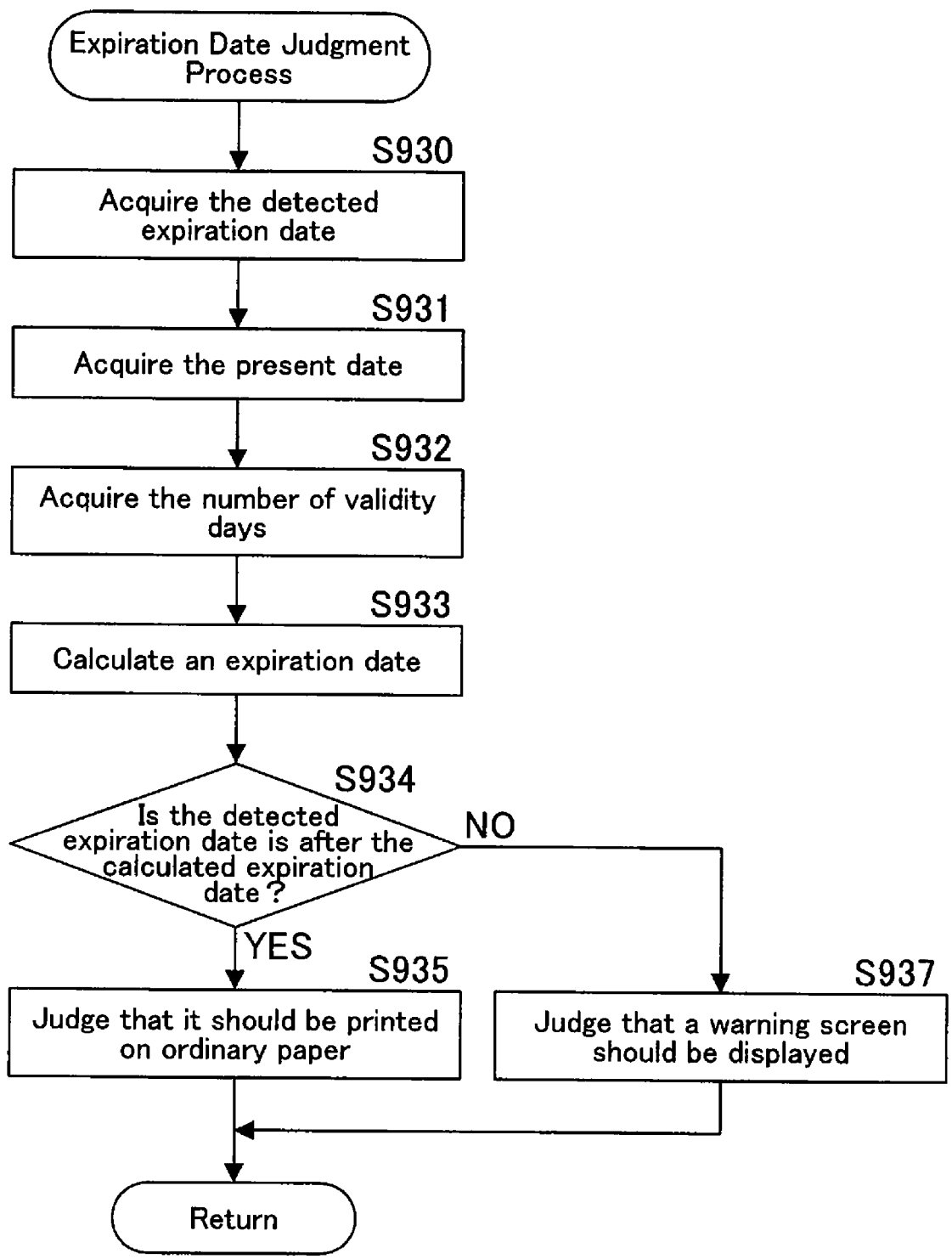
FIG. 13 is a subroutine showing an expiration time judgment process that is Step S206 of the flowchart in FIG. 12.

If it is judged that the image data includes a date representing an expiration time (YES in Step S204), the routine proceeds to Step S206 and an expiration time judgment process shown in FIG. 13 is performed.

Jumping ahead to Step S930 of FIG. 13 for the expiration time judgment process, under the control of the CPU 10 of the controller 9, the date representing an expiration time, which is detected therefrom, is acquired (Step S930), and the present date is acquired from inside of the apparatus (Step S931), and then the number of validity days, which is stored in the date storage 19, is acquired (Step S932).

Under the control of the CPU 10 of the controller 9, an expiration time is calculated based on the present date and the number of validity days that are just acquired (Step S933). Then the routine proceeds to Step S934.

In Step S934, under the control of the CPU 10 of the controller 9, it is judged whether or not the detected date representing an expiration time is after the calculated expiration time. If it is judged that the detected date representing an expiration time is after the calculated expiration time (YES in Step S934), under the control of the CPU 10 of the controller 9, it is judged that the image data should be printed on ordinary paper (Step S935), since the image data will not be unnecessary in a short period. Then the routine returns and proceeds to Step S211 of FIG. 12. On the other hand, if it is judged that the detected date representing an expiration time is before the calculated expiration time (NO in Step S934), under the control of the CPU 10 of the controller 9, it is judged that a warning screen should be displayed (Step S937), since the image data will be unnecessary in a short period. Then the routine returns and proceeds to Step S207 of FIG. 12.

On the other hand, in Step S204, if it is judged that the image data read out from the document does not include a date representing an expiration time (NO in Step S204), under the control of the CPU 10 of the controller 9, it is judged whether or not the image data includes a certain keyword representing an expiration time (Step S205), since the image data still may include it.

If it is judged that the image data includes a certain keyword (YES in Step S205), the routine proceeds to Step S207. If it is judged that the image data does not include a certain keyword (NO in Step S205), the routine proceeds to Step S211.

In Step S207, under the control of the CPU 10 of the controller 9, a first warning screen 215 (shown in FIG. 14) is displayed on the operation and display portion 11 in order to let the user know that the image data has a short validity period left. Then, the routine waits until a user instruction to select a type of print sheets is given (Step S208). In addition to a message recommending electronic paper for outputting, a "print on electronic paper" button 216, a "print on ordinary paper" button 217, and etc. are also displayed in the first warning screen 215.

If the "print on electronic paper" button 216 is pressed via the first warning screen 215 (NO in Step S208), under the control of the CPU 10 of the controller 9, the image data is written on electronic paper by the electronic paper writer 17 (Step S209) since a user instruction to output on electronic paper is given. And the electronic paper is discharged (Step S210). Then the routine terminates. If the "print on ordinary paper" button 217 is pressed via the first warning screen 215 (YES in Step S208), the routine proceeds to Step S211 since a user instruction to output on ordinary paper is given.

In Step S211, under the control of the CPU 10 of the controller 9, an image to be printed is formed by the image former 16 based on the image data and the formed image is printed on ordinary paper. And the ordinary paper is discharged (Step S210). Then the routine terminates.

As described above in this embodiment, if image data read out from a document has a short validity period left or a keyword representing an expiration time, a message is displayed to let a user know about it, and a screen is also displayed to accept a user instruction to select a type of print sheets. In this way, the user knows that the image data has a short validity period left or has an expiration time, and is allowed to select a type of print sheets, which is appropriate for his/her intention.

Embodiment—3

Hereinafter, an image forming apparatus according to a third embodiment of the present invention will be explained. In this third embodiment, the image forming apparatus displays a warning screen and waits until a user instruction to select a type of print sheets is given, if image data read out from a document includes a date representing an expiration time and the image data has a short validity period left, or if the image data includes a certain keyword representing an expiration time. And if a user instruction to select a type of print sheets is not given within a predetermined period of time, execution of processing is immediately cancelled. Since a printing system and a printing apparatus 2 according to this third embodiment have the same configurations as those according to the first embodiment, explanation about their configurations are omitted here. Further, sheet feed trays 42, 43, 44 and a manual sheet feed tray 45 of the printing apparatus 2 load only ordinary paper and electronic paper therein.

[Operations of the Printing Apparatus 2]

Figure 15:
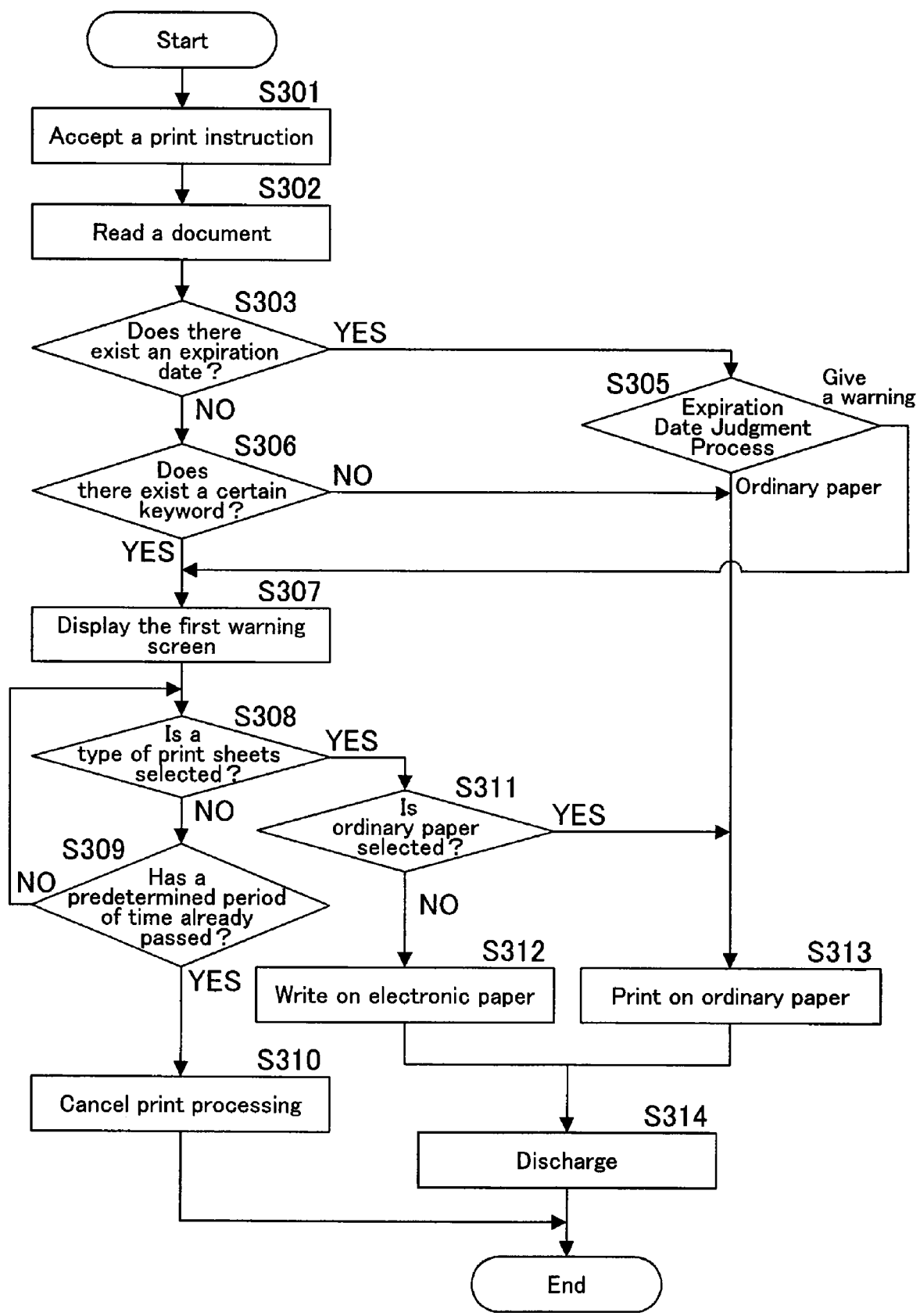
FIG. 15 is a flowchart showing a procedure performed in the image forming apparatus according to a third embodiment of the present invention.

A procedure described above, which is performed in the printing apparatus 2, will be explained with reference to a flowchart shown in FIG. 15 This procedure is executed by the CPU 10 of the controller 9 according to a program stored in a recording medium such as the ROM 12.

If a print instruction given by a user is accepted (Step S301), under the control of the CPU 10 of the controller 9, a document placed by the user is read by the image reader 14 (Step S302), and an expiration time is detected from image data read out from the document by the expiration time attribute detector 18, in other words, it is judged whether or not the image data includes a date representing an expiration time (Step S303).

If it is judged that the image data includes a date representing an expiration time (YES in Step S303), the routine proceeds to Step S305 and an expiration time judgment process is performed. Since this expiration time judgment process corresponds to the procedure shown in FIG. 13, its explanation is omitted.

If it is judged in the expiration time judgment process, that the image data should be printed on ordinary paper ("ordinary paper" in Step S305), the routine proceeds to Step S313. If it is judged that a warning screen should be displayed ("warning" in Step S305), the routine proceeds to Step S307.

On the other hand, in Step S303, if it is judged that the image data does not include a date representing an expiration time (NO in Step S303), under the control of the CPU 10 of the controller 9, a certain keyword is detected from the image data, in other words, it is judged whether or not the image data includes a certain keyword representing an expiration time (Step S306).

If it is judged that the image data includes a certain keyword (YES in Step S306), the routine proceeds to Step S307 since the image data has an expiration time. If it is judged that the image data does not include a certain keyword (NO in Step S306), the routine proceeds to Step S313 since the image data does not have an expiration time.

Figure 14:
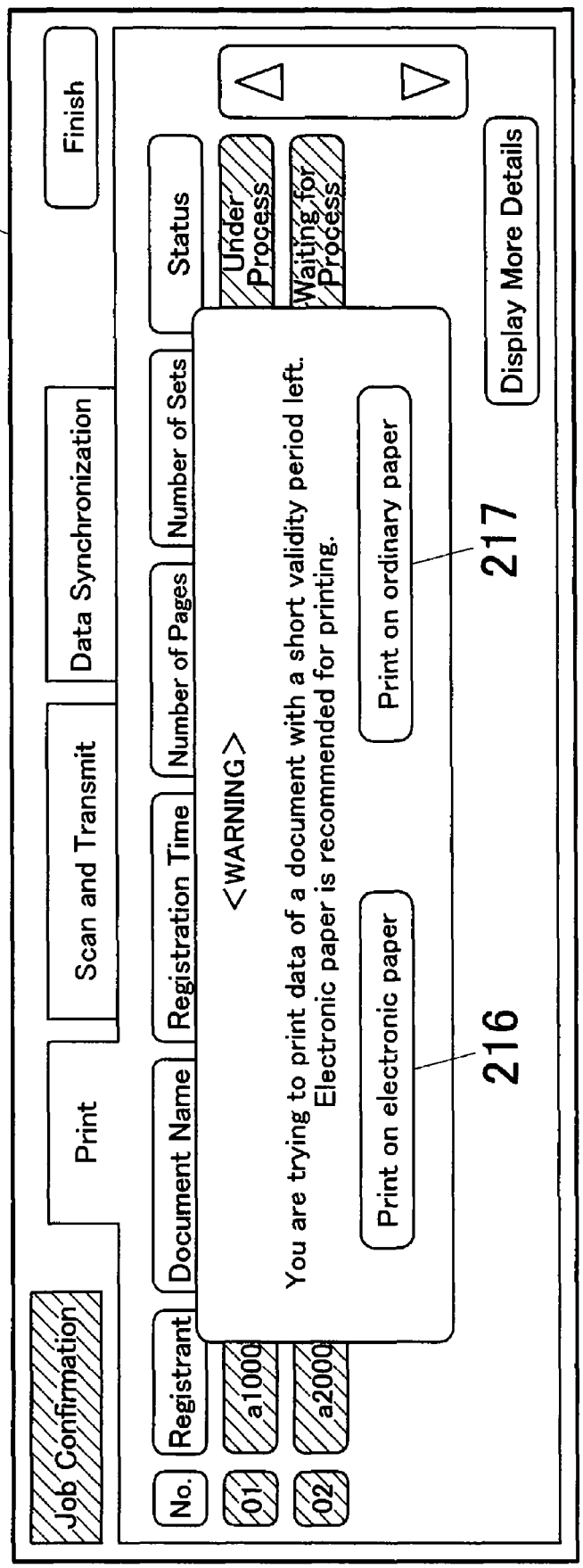
FIG. 14 is a view showing an example of a first warning screen that gives a warning to the user and accepts a user instruction to select a type of print sheets.

In Step S307, under the control of the CPU 10 of the controller 9, the first warning screen 215 shown in FIG. 14 is displayed on the operation and display portion 11 in order to give a warning to the user and let him/her know that the image data has a short validity period left. Then, the routine waits until a user instruction to select a type of print sheets is given (Step S308).

If a user instruction to select a type of print sheets is not given (NO in Step S308), under the control of the CPU 10 of the controller 9, it is judged whether or not a predetermined period of time has already passed (Step S309).

If it is judged that a predetermined period of time has not yet passed (NO in Step S309), the routine goes back to Step S308, and repeats Steps S308 and S309 until the predetermined period of time passes or until a user instruction to select a type of print sheets is given. If it is judged that a predetermined period of time has already passed (YES in Step S309), under the control of the CPU 10 of the controller 9, print processing is cancelled (Step S310) since the user possibly may have forgotten giving an instruction. Then the routine terminates.

On the other hand, if a user instruction to select a type of print sheets is given (YES in Step S308), under the control of the CPU 10 of the controller 9, it is judged the selected type of print sheets is either ordinary paper or electronic paper (Step S311).

If the "print on ordinary paper" button 217 is pressed by the user via the first warning screen 215 (YES in Step S311), the routine proceeds to Step S313 since a user instruction to print on ordinary paper is given.

In Step S313, under the control of the CPU 10 of the controller 9, an image to be printed is formed by the image former 16 based on the image data and the formed image is printed on ordinary paper. And the ordinary paper is discharged (Step S314). Then the routine terminates.

If the "print on electronic paper" button 216 is pressed by the user via the first warning screen 215 (NO in Step S311), under the control of the CPU 10 of the controller 9, the image data is written on electronic paper by the electronic paper writer 17 (Step S312) since a user instruction to write on electronic paper is given. And the electronic paper is discharged (Step S314). Then the routine terminates.

As described above in this embodiment, if an instruction to select a type of print sheets is not given within a predetermined period of time, execution of the procedure is automatically cancelled. Thereby, instructions given by other users to execute jobs such as print jobs, are prevented from being suspended for a long time, which contributes to smooth job execution.

Embodiment—4

Hereinafter, a printing apparatus according to a fourth embodiment of the present invention will be explained. In this fourth embodiment, a warning is given to a user when ordinary paper loaded in a sheet feed tray of the printing apparatus is run-out in the case of printing on ordinary paper, if image date read out from a document includes a date representing an expiration time and the image data has a short validity period left, or if the image data includes a certain keyword representing an expiration time.

Since a printing system and a printing apparatus 2 according to this fourth embodiment have the same configurations as those according to the first embodiment, explanation about their configurations are omitted here. Further, sheet feed trays 42, 43, 44 and a manual sheet feed tray 45 of the printing apparatus 2 load only ordinary paper and electronic paper therein.

[Operations of the Printing Apparatus 2]

Figure 16:
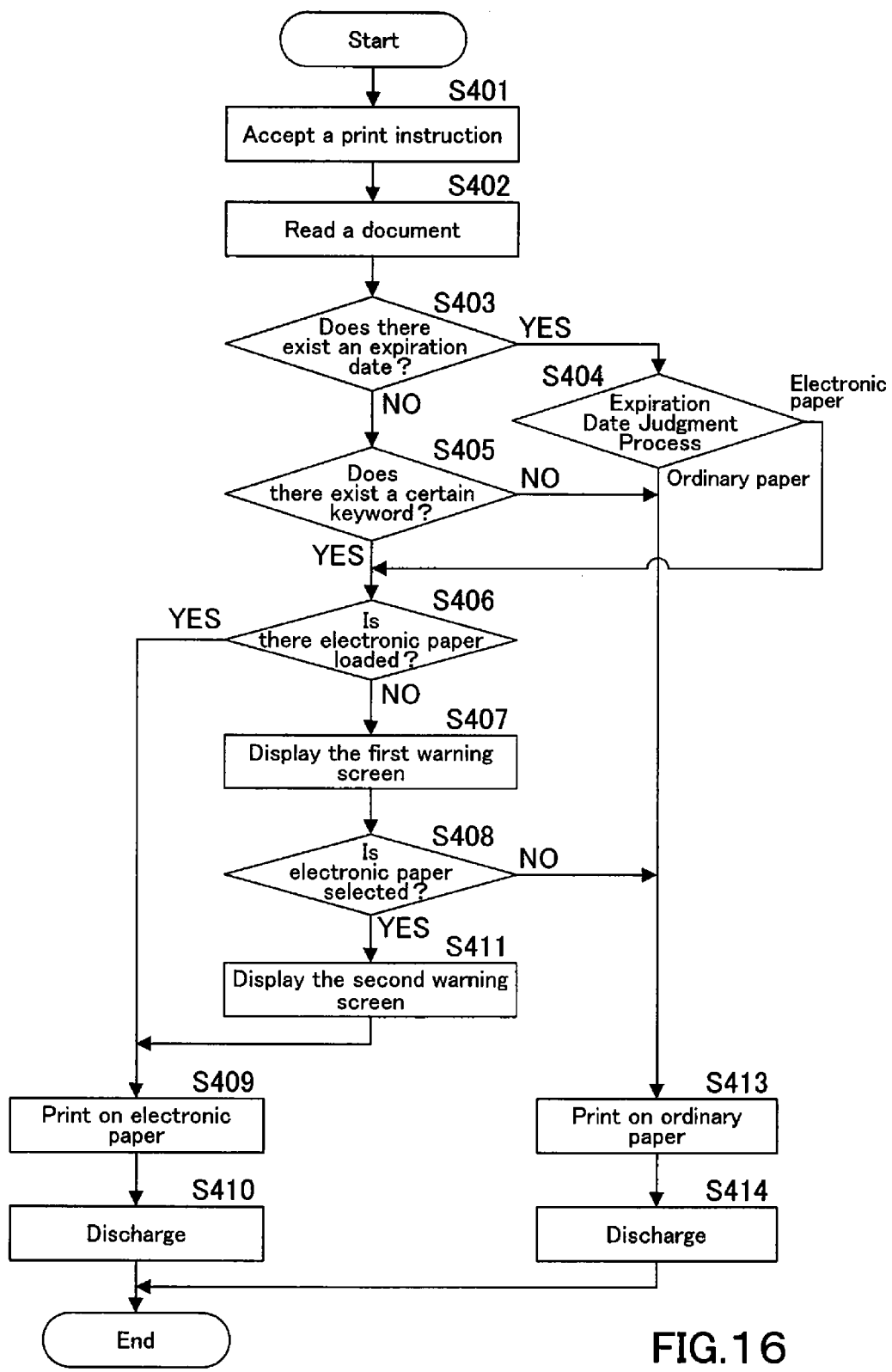
FIG. 16 is a flowchart showing a procedure performed in the image forming apparatus according to a fourth embodiment of the present invention.

A procedure described above, which is performed in the printing apparatus 2, will be explained with reference to a flowchart shown in FIG. 16. This procedure is executed by the CPU 10 of the controller 9 according to a program stored in a recording medium such as the ROM 12.

If a print instruction given by a user is accepted (Step S401), under the control of the CPU 10 of the controller 9, a document placed by the user is read by the image reader 14 (Step S402), and an expiration time is detected from image data read out from the document by the expiration time attribute detector 18, in other words, it is judged whether or not the image data includes a date representing an expiration time (Step S403).

If it is judged that the image data includes a date representing an expiration time (YES in Step S403), the routine proceeds to Step S404 and an expiration time judgment process is performed. Since the expiration time judgment process corresponds to the procedure shown in FIG. 11, its explanation is omitted.

If it is judged in the expiration time judgment process, that the image data should be printed on ordinary paper ("ordinary paper" in Step S404), the routine proceeds to Step S413. If it is judged that it should be written on electronic paper ("electronic paper" in Step S404), the routine proceeds to Step S406.

On the other hand, in Step S403, if it is judged that the image data does not include a date representing an expiration time (NO in Step S403), under the control of the CPU 10 of the controller 9, a certain keyword is detected from the image data, in other words, it is judged whether or not the image data includes a certain keyword representing an expiration time (Step S405).

If it is judged that the image data does not include a certain keyword (NO in Step S405), the routine proceeds to Step S413 since the image data does not have an expiration time. If it is judged that the image data includes a certain keyword (YES in Step S405), the routine proceeds to Step S406 since the image data has an expiration time.

In Step S406, under the control of the CPU 10 of the controller 9, it is judged whether or not there is electronic paper loaded in the sheet feed trays 42, 43, 44 or the manual sheet feed tray 45.

If it is judged that there is electronic paper loaded therein (YES in Step S406), under the control of the CPU 10 of the controller 9, the image data is written on the electronic paper by the electronic paper writer 17 (Step S409) since it is ready for writing image data on electronic paper. And the electronic paper is discharged (Step S410). Then the routine terminates. If it is judged that there is no electronic paper loaded therein (NO in Step S406), under the control of the CPU 10 of the controller 9, the first warning screen 215 shown in FIG. 14 is displayed on the operation and display portion 11 in order to give a warning to the user and let him/her know that there is no electronic paper loaded in the apparatus (Step S407), and the routine waits until a user instruction to select a type of print sheets is given (Step S408).

Figure 17:
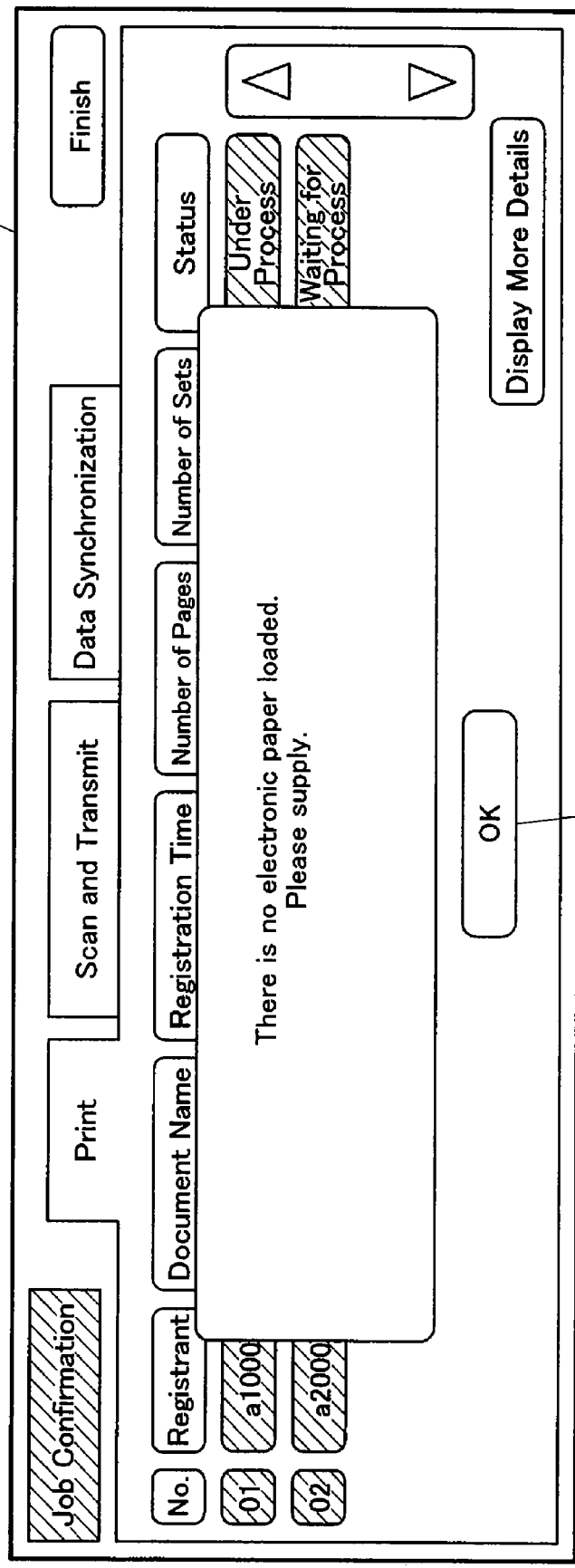
FIG. 17 is a view showing an example of a second warning screen that gives a warning to the user and lets him/her know that there is no electronic paper loaded in the apparatus, and requests him/her to supply electronic paper.

If the "print on electronic paper" button 216 is pressed via the first warning screen 215 (YES in Step S408), under the control of the CPU 10 of the controller 9, a second warning screen 415 shown in FIG. 17 is displayed on the operation and display portion 11 in order to give a warning to the user and request him/her to supply electronic paper, since a user instruction to write on electronic paper is given. In addition to a message warning that there is no electronic paper loaded in any sheet feed tray, an "OK" button 416 is also displayed in the second warning screen 415 in order to accept user confirmation.

If the "OK" button 416 is pressed by the user via the second warning screen 415, the routine proceeds to Step S409 and the image data is written on electronic paper (Step S409). And the electronic paper is discharged (Step S410). Then the routine terminates.

On the other hand, if the "print on ordinary paper" button 217 is pressed via the first warning screen 215 (NO in Step S408), the routine proceeds to Step S413 since a user instruction to print on ordinary paper is given.

In Step S413, under the control of the CPU 10 of the controller 9, an image to be printed is formed by the image former 16 based on the image data and the formed image is printed on ordinary paper. And the ordinary paper is discharged (Step S414). Then the routine terminates.

In this embodiment, image data is printed on ordinary paper if electronic paper is not selected. Alternatively, image data can be printed on OHP sheets or other, instead of ordinary paper.

As described above in this embodiment, if there is electronic paper loaded in the printing apparatus 2, image data with a short validity period left or a certain keyword is automatically printed on electronic paper without a warning screen displayed on the operation and display portion 11. In this way, a user does not have to bother selecting a type of print sheets manually. If there is no electronic paper loaded in any sheet feed tray such as the sheet feed tray 42, a message is displayed on the operation and display portion 11 to let the user know about it. In this way, a user knows that there is no electronic paper loaded in the printing apparatus 2, so that he/she can supply electronic paper.

Embodiment—5

Hereinafter, a printing apparatus according to a fifth embodiment of the present invention will be explained. In this fifth embodiment, if three types of print sheets (ordinary paper, OHP sheets and electronic paper) are loaded in sheet feed trays of the printing apparatus 2 such as the sheet feed tray 42, it is judged whether or not image data read out from a document includes a date representing an expiration time and whether or not the image data includes a certain keyword representing an expiration time. Then, depending on the judgment result, the image data is written (printed) on electronic paper, ordinary paper or OHP sheets.

Since a printing system and a printing apparatus 2 according to this fifth embodiment have the same configurations as those according to the first embodiment, explanation about their configurations are omitted here. Further, sheet feed trays 42, 43, 44 and a manual sheet feed tray 45 of the printing apparatus 2 load three types of print sheets therein, which are electronic paper, ordinary paper and OHP sheets.

[Operations of the Printing Apparatus 2]

Hereinafter, a procedure described above, which is performed in the printing apparatus 2 will be explained with reference to flowcharts shown in FIG. 18, FIG. 19 and FIG. 20. This procedure is executed by the CPU 10 of the controller 9 according to a program stored in a recording medium such as the ROM 12.

If a print instruction given by a user is accepted (Step S501), under the control of the CPU 10 of the controller 9, a user instruction given to select a type of print sheets is accepted via the operation and display portion 11 (Step S502), and a document placed by the user is read (Step S503).

Then, under the control of the CPU 10 of the controller 9, it is judged whether or not the type of print sheets, which is selected by the user, is electronic paper (Step S504).

If it is judged that the selected type of print sheets is electronic paper (YES in Step S504), under the control of the CPU 10 of the controller 9, the image data is written on electronic paper by the electronic paper writer 17 (Step S517) since a user instruction to write on electronic paper is given. And the electronic paper is discharged (Step S518). Then, the routine terminates. If it is judged that the selected type of print sheets is other than electronic paper (NO in Step S504), under the control of the CPU 10 of the controller 9, it is judged whether or not the selected type of print sheets is OHP sheets (Step S505).

If it is judged that the selected type of print sheets is other than OHP sheets (if it is ordinary paper) (NO in Step S505), under the control of the CPU 10 of the controller 9, an expiration time is detected by the expiration time attribute detector 18 from image data read out from the document, in other words, it is judged whether or not the image data includes a date representing an expiration time (Step S510).

Figure 19:
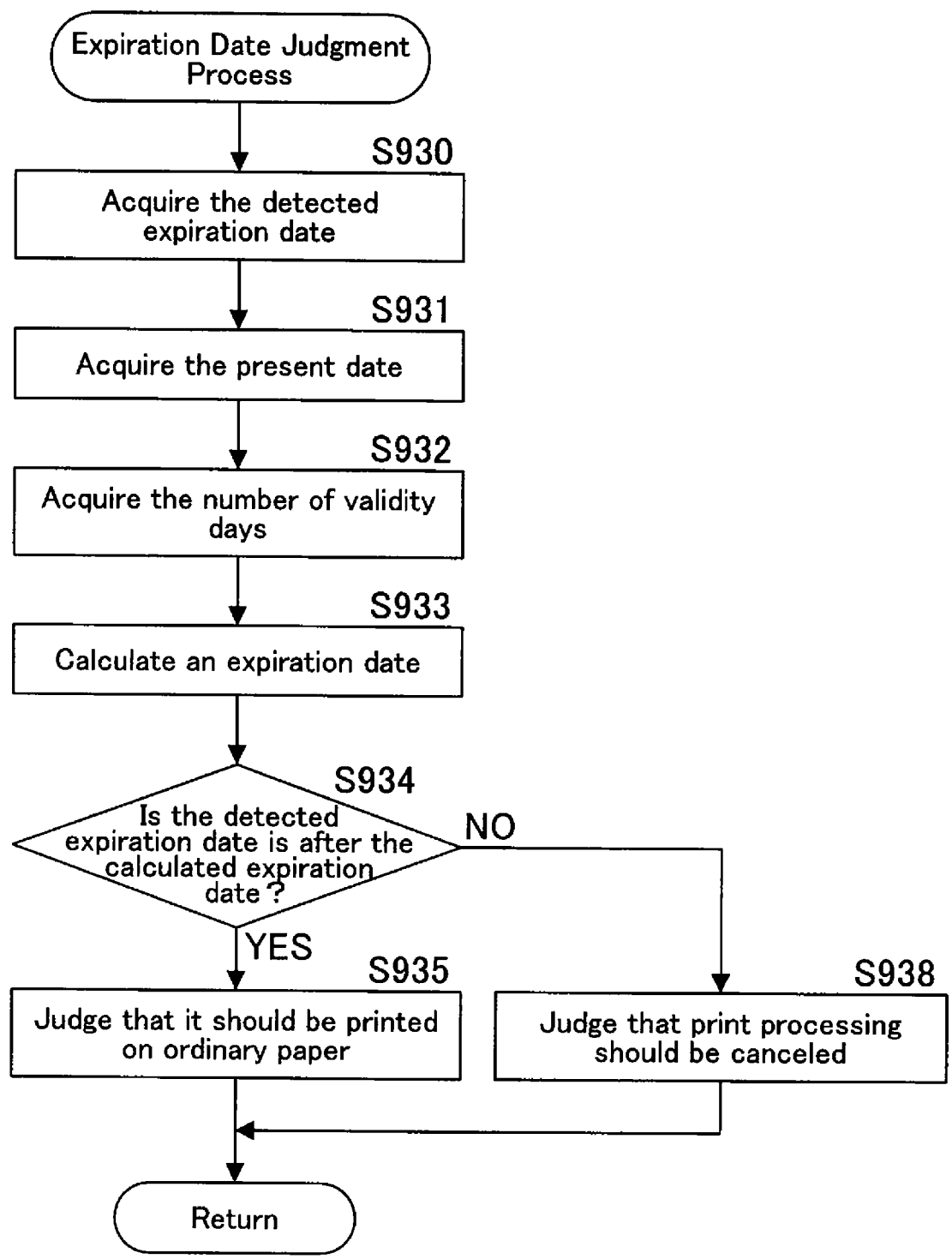
FIG. 19 is a subroutine showing an expiration time judgment process that is Step S514 of the flowchart in FIG. 18.

If it is judged that the image data includes a date representing an expiration time (YES in Step S510), under the control of the CPU 10 of the controller 9, the routine proceeds to Step S514 and an expiration time judgment process shown in a flowchart of FIG. 19 is performed.

Jumping ahead to Step S930 of FIG. 19 for the expiration time judgment process, under the control of the CPU 10 of the controller 9, the date representing an expiration time, which is detected therefrom, is acquired. Then, the present date is acquired from inside of the apparatus (Step S931), and the number of validity days, which is stored in the data storage 19, is acquired (Step S932).

Subsequently, under the control of the CPU 10 of the controller 9, an expiration time is calculated based on the present date and the number of validity days that are just acquired (Step S933). Then the routine proceeds to Step S934.

In Step S934, under the control of the CPU 10 of the controller 9, it is judged whether not the detected date representing an expiration time is after the calculated expiration time. If it is judged that the detected date indicating an expiration is after the calculated expiration time (YES in Step S934), under the control of the CPU 10 of the controller 9, it is judged that the image data should be printed on ordinary paper (Step S935), since the image data will not be unnecessary in a short period. Then, the routine returns and proceeds to Step S515 of FIG. 18. On the other hand, if it is judged that the detected date representing an expiration time is before the calculated expiration time (NO in Step S934), under the control of the CPU 10 of the controller 9, it is judged that print processing should be cancelled (Step S938), since the image data will be unnecessary in a short period. Then, the routine returns and proceeds to Step S512 of FIG. 18.

Figure 18:
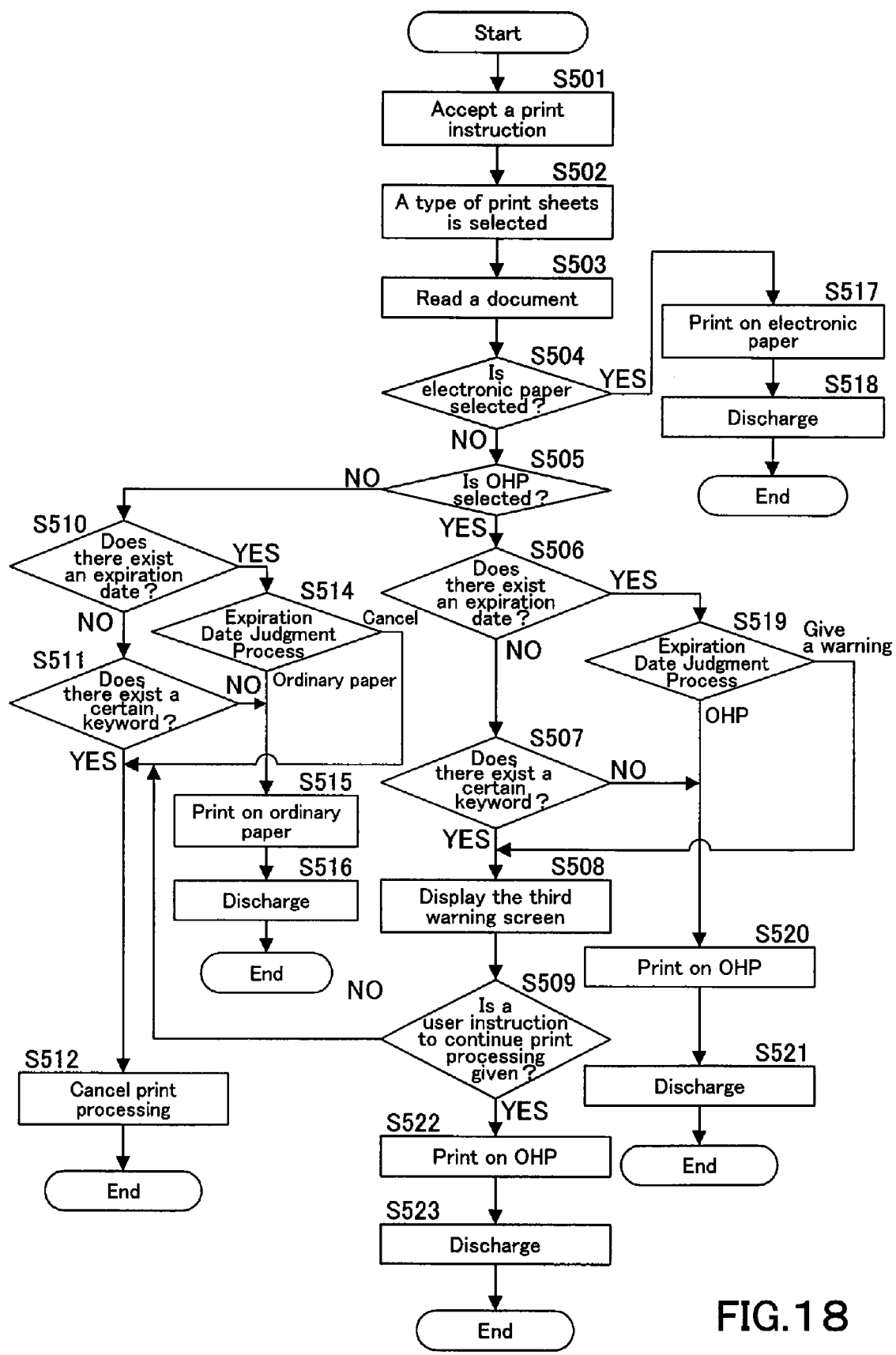
FIG. 18 is a flowchart showing a procedure performed in the image forming apparatus according to a fifth embodiment of the present invention.

On the other hand, in Step S510 of FIG. 18, if it is judged that the image data does not include a date representing an expiration time (NO in Step S510), under the control of the CPU 10 of the controller 9, a certain keyword is detected by the expiration time attribute detector 18, in other words, it is judged whether or not the image data includes a certain keyword representing an expiration time (Step S511), since the image data still may include it.

If it is judged that the image data does not include a certain keyword (NO in Step S511), the routine proceeds to Step S515 since the image data does not have an expiration time. If it is judged that the image data includes a certain keyword (YES in Step S511), the routine proceeds to Step S512 and print processing is cancelled, since the image data has an expiration time and printing the image data on ordinary paper would lead to wasting paper resource. Then the routine terminates.

In Step S515, under the control of the CPU 10 of the controller 9, an image to be printed is formed by the image former 16 based on the image data and the formed image is printed on ordinary paper (Step S515). And the ordinary paper is discharged (Step S516). Then the routine terminates.

On the other hand, in Step S505, if it is judged that the type of print sheets, which is selected by the user, is OHP sheets (YES in Step S505), under the control of the CPU 10 of the controller 9, an expiration time is detected from the image data, in other words, it is judged whether or not the image data includes a date representing an expiration time (Step S506).

Figure 20:
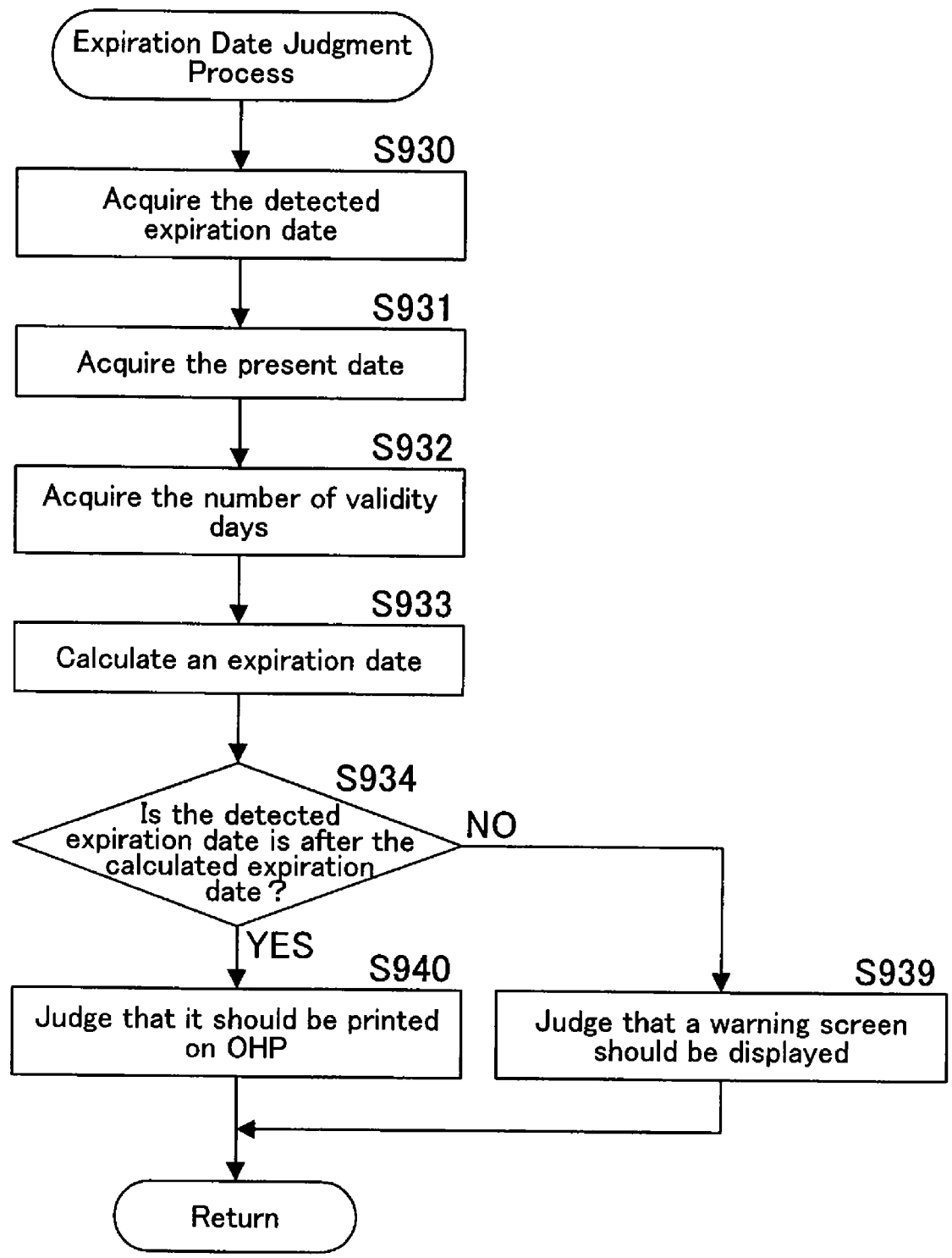
FIG. 20 is a subroutine showing an expiration time judgment process that is Step S519 of the flowchart in FIG. 18.

If it is judged that the image data includes a date representing an expiration time (YES in Step S506), the routine proceeds to Step S519 and an expiration time judgment process shown in a flowchart of FIG. 20 is performed.

Steps S930 through S934 of the expiration time judgment process shown in FIG. 20 are exactly the same as those shown in FIG. 19. And if it is judged that the detected date representing an expiration time is after the calculated expiration time (YES in Step S934), then it is judged that the image data should be printed on OHP sheets (Step S940). Then, the routine returns and proceeds to Step S520 of FIG. 18. If it is judged that the detected date representing an expiration time is before the calculated expiration time (NO in Step S934), a warning screen is displayed (Step S939). Then, the routine returns and proceeds to Step S508 of FIG. 18.

On the other hand, in Step S506 of FIG. 18, if it is judged that the image data does not include a date representing an expiration time (NO in Step S506), under the control of the CPU 10 of the controller 9, a certain keyword is detected from the image data, in other words, it is judged whether or not the image data includes a certain keyword representing an expiration time (Step S507).

If it is judged that the image date does not include a certain keyword (NO in Step S507), the routine proceeds to Step S520.

In Step S520, under the control of the CPU 10 of the controller 9, an image to be printed is formed by the image former 16 based on the image data and the formed image is printed on OHP sheets. And the OHP sheets are discharged (Step S521). Then the routine terminates.

Figure 21:
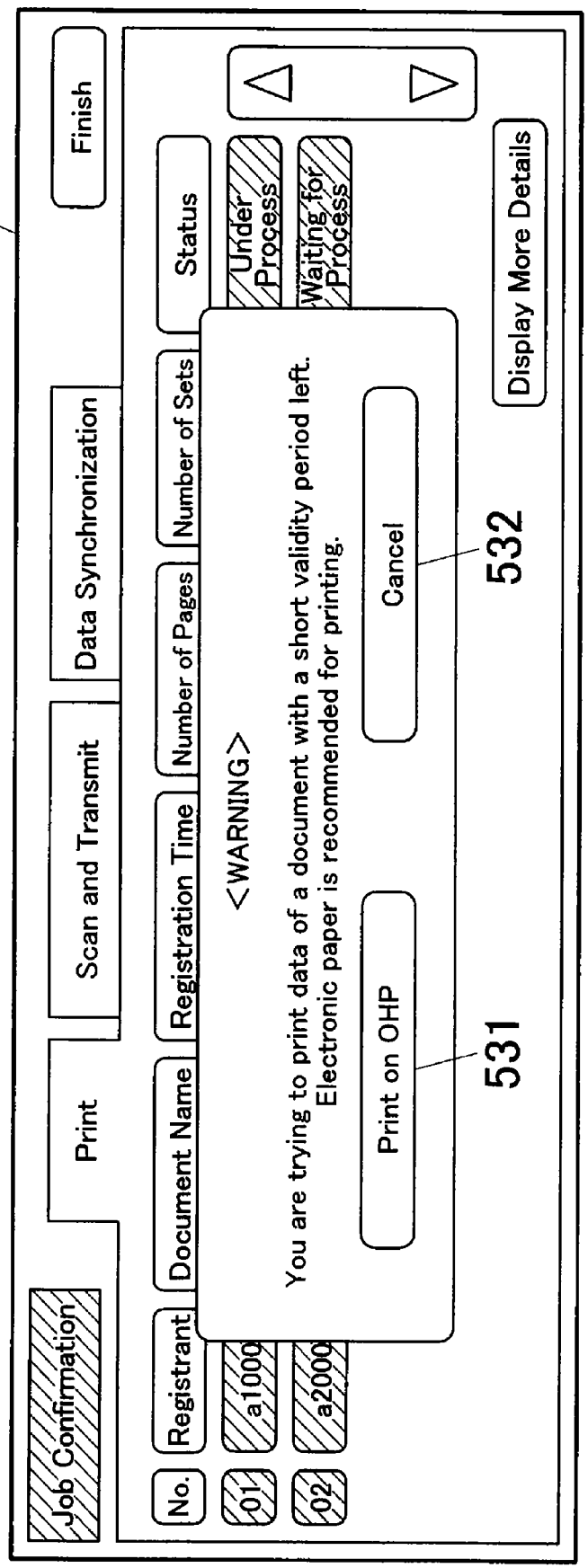
FIG. 21 is a view showing an example of a third warning screen that gives a warning to the user and accepts a user instruction to select on which type of print sheets image data should be printed, between OHP sheets and other types of print sheets.

If it is judged that the image data includes a certain keyword (YES in Step S507), under the control of the CPU 10 of the controller 9, a third warning screen 530 shown in FIG. 21 is displayed on the operation and display portion 11 in order to give a warning (Step S508), since the image data has an expiration time. And the routine waits until a user instruction to continue or cancel print processing is given (Step S509). In addition to a message warning that the image data read out from the document has an expiration time, a "print on OHP"

button 531 is also displayed in the third warning screen 530 to accept a user instruction to print on OHP sheets, and a "cancel" button 532 is also displayed therein to cancel print processing.

If the "print on OHP" button 531 is pressed by the user (YES in Step S509), under the control of the CPU 10 of the controller 9, an image to be printed is formed by the image former 16 based on the image data and the formed image is printed on OHP sheets (Step S522). And the OHP sheets are discharged (Step S523). Then the routine terminates. If the "cancel" button 532 is pressed by the user (NO in Step S509), the routine proceeds to Step S512.

In Step S512, under the control of the CPU 10 of the controller 9, print processing is canceled (Step S512). Then the routine terminates.

As described above in this embodiment, users can print image data having an expiration time on electronic paper, even if three types of print sheets (ordinary paper, OHP sheets and electronic paper) are loaded in sheet feed trays of a printing apparatus.

In this embodiment, a date and a certain keyword are detected by the expiration time attribute detector 18 from image data read out from a document. Alternatively, a date and a certain keyword can be detected from image data transmitted from the terminal apparatus 1. In this case, these are detected from a profile or main text of the image data.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising:
    at least one printer that prints inputted image data on a plurality of types of print sheets;
    an expiration time attribute detector that detects from the image data, data representing an expiration time attribute; and
    a controller that judges based on the detection result drawn by the expiration time attribute detector, on which type of print sheets the image data should be printed, among the plurality of types of print sheets, then controls the image forming apparatus itself based on the judgment,
    wherein the plurality of types of print sheets include paper, paper-like mediums and electronic paper, and the printer printing the image data on electronic paper correspond to a writer writing image data.

2. The image forming apparatus as recited in claim 1, wherein the data representing an expiration time attribute corresponds to a date or a certain keyword representing an expiration time of the image data.

3. The image forming apparatus as recited in claim 1, wherein the expiration time attribute detector detects from a profile of the image data, the data representing an expiration time attribute.

4. The image forming apparatus as recited in claim 1 further comprising a display, and wherein the controller makes a warning displayed on the display, if the expiration time attribute detector detects from the image data, the data representing an expiration time attribute.

5. The image forming apparatus as recited in claim 4, wherein the controller accepts a user instruction given to select a type of print sheets on which the image data is to be printed, after making that warning displayed.

6. The image forming apparatus as recited in claim 5, wherein the controller cancels print processing if a user instruction to select a type of print sheets is not given within a predetermined period of time.

7. The image forming apparatus as recited in claim 4, further comprising:
    a sheet type detector that detects a type of print sheets loaded in a sheet feed tray; and
    a judger that judges a validity period left behind is either short or long based on the present date and the detected data representing an expiration time attribute, if the expiration time attribute detector detects that data from the image data, and
    wherein:
    the controller makes the image data written on electronic paper without making a warning displayed on the display, if the judger judges the validity period left behind is short and the sheet type detector detects electronic paper loaded in a sheet feed tray.

8. The image forming apparatus as recited in claim 1, wherein the controller accepts a user instruction given to select a type of print sheets, then switches between operation modes depending on the selected type of print sheets.

9. The image forming apparatus as recited in claim 8, wherein:
    the controller cancels print processing, if the judger judges the validity period left behind is small based on the present date and the detected data representing an expiration time attribute, and the selected type of print sheets is ordinary paper;

the controller makes a warning displayed on the display and accepts the user selecting instruction, if the judger judges the validity period behind is short based on the present date and the detected data representing an expiration time attribute, and the selected type of print sheets is OHP sheets; and the controller makes the image data written on electronic paper, if the selected type of print sheets is electronic paper.

10. A print sheet selection method comprising:

printing inputted image data on a plurality of types of print sheets;

detecting from the image data, data representing an expiration time attribute; and judging based on the detection result drawn in the detection step, on which type of print sheets the image data should be printed, among the plurality of types of print sheets, then controlling an image forming apparatus based on the judgment, wherein the plurality of types of print sheets include paper, paper-like mediums and electronic paper, and printing the image data on electronic paper in the printing step corresponds to writing image data.

11. The print sheet selection method as recited in claim 10, wherein the data representing an expiration time attribute corresponds to a date or a certain keyword representing an expiration time of the image data.

12. The print sheet selection method as recited in claim 10, further comprising:

displaying a warning on a display if the data representing an expiration time attribute is detected from the image data.

13. The print sheet selection method as recited in claim 12, further comprising:

detecting a type of print sheets loaded in a sheet feed tray;

judging a validity period left behind is either short or long based on the present date and the data representing an expiration time attribute, if the data is detected from the image data; and writing the image data on electronic paper without displaying the warning on a display, if the validity period left behind is judged as being short and electronic paper is detected as being loaded in a sheet feed tray in the sheet type detection step.

14. A non-transitory recording medium storing in itself a print sheet selection program to make a computer of an image forming apparatus execute:

printing inputted image data on a plurality of types of print sheets;

detecting from the image data, data representing an expiration time attribute; and judging based on the detection result drew in the detection step, on which type of print sheets the image data should be printed, among the plurality of types of print sheets, then controlling the image forming apparatus based on the judgment, wherein the plurality of types of print sheets include paper, paper-like mediums and electronic paper, and printing the image data on electronic paper in the printing step corresponds to writing image data.

15. The non-transitory recording medium storing in itself the program as recited in claim 14, wherein the data representing an expiration time attribute corresponds to a date or a certain keyword representing an expiration time of the image data.

16. The non-transitory recording medium storing in itself the program as recited in claim 14, to make the computer further execute:

displaying a warning on a display if the data representing an expiration time attribute is detected from the image data.

17. The non-transitory recording medium storing in itself the program as recited in claim 14, to make the computer further execute:

detecting a type of print sheets loaded in a sheet feed tray;

judging a validity period left behind is either short or long based on the present date and the data representing an expiration time attribute, if the data is detected from the image data; and writing the image data on electronic paper without displaying the warning on a display, if the validity period left behind is judged as being short and electronic paper is detected as being loaded in a sheet feed tray in the sheet type detection step.

* * * * *